United States Patent [19]
Brenza et al.

[11] Patent Number: 5,426,748
[45] Date of Patent: Jun. 20, 1995

[54] GUEST/HOST EXTENDED ADDRESSING METHOD AND MEANS WITH CONTIGUOUS ACCESS LIST ENTRIES

[75] Inventors: James G. Brenza, Putnam Valley; Joseph M. Gdaniec, Vestal; Peter H. Gum; Kathryn M. Jackson, both of Poughkeepsie; Mark M. Maccabee, Kingston; Casper A. Scalzi, Poughkeepsie; Bhaskar Sinha, Wappingers Falls, all of N.Y.

[73] Assignee: International Business Machines Corporation, Armonk, N.Y.

[21] Appl. No.: 816,911

[22] Filed: Jan. 3, 1992

[51] Int. Cl.⁶ .............................................. G06F 12/08
[52] U.S. Cl. ............................... 395/400; 364/DIG. 1
[58] Field of Search ................................. 395/400, 425

[56] References Cited

U.S. PATENT DOCUMENTS

| | | | |
|---|---|---|---|
| 4,459,661 | 7/1984 | Kaneda et al. | 395/400 |
| 4,792,895 | 12/1988 | Tallman | 395/375 |
| 4,979,098 | 12/1990 | Baum et al. | 395/400 |
| 5,008,811 | 4/1991 | Scalzi et al. | 395/400 |
| 5,023,773 | 6/1991 | Baum et al. | 395/425 |
| 5,077,654 | 12/1991 | Ohtsuki | 395/800 |
| 5,230,069 | 7/1993 | Brelsford et al. | 395/400 |

FOREIGN PATENT DOCUMENTS

| | | |
|---|---|---|
| 0327839 | 1/1989 | European Pat. Off. . |
| 3841602 | 6/1988 | Germany . |
| 3833933 | 4/1989 | Germany . |

*Primary Examiner*—Jack B. Harvey
*Assistant Examiner*—Michael A. Whitfield
*Attorney, Agent, or Firm*—Bernard M. Goldman

[57] ABSTRACT

An addressing method using large addresses in a guest-/host environment within a computer system. The guests are operating-systems, and the host is a hypervisor program. Each guest has a guest real address space (guest RAS) mapped onto a host large real address space (host LRAS) using means disclosed herein. To do this, each guest RAS is first assigned to a contiguous part of a host large virtual address space (LVAS) by assigning each guest RAS to one or more contiguous units of virtual addressing in the host LVAS, each unit having a 2 gigabyte (GB) size. The host LVAS is represented by a sequence of entries (ALEs) in a host access list (AL), in which each ALE represents a 2 GB unit of virtual addressing in the host LVAS. An ALE is selected in the AL by using a high-order part of a host large virtual address (host LVA) representing a guest RA or LRA. A host LVA is generated from a guest RA for obtaining the guest address in host main storage. The host LVA is translated in a number of different ways to a host LRA, depending on the type of guest providing the corresponding guest RA or LRA. The guest types include V=V, V=FC, V=FD and V=R guests, which is indicated in a guest control block (GCB).

25 Claims, 10 Drawing Sheets

GUEST/HOST EXTENDED ADDRESSING METHOD AND MEANS WITH CONTIGUOUS ACCESS LIST ENTRIES

INTRODUCTION

This invention uniquely describes a method of mapping the real storage of multiple guests of a hypervisor operating system into a host large real storage, where the guest storages may be either of previously normal size or of extended size. The host storage may be larger than previously provided, and upward compatibility from previous systems is a requirement.

BACKGROUND

Commercial computer systems presently exist which operate with a host hypervisor control program that supports a plurality of guest operating systems. Examples of such systems include the IBM VM/ESA programming systems for the IBM S/9000 systems. Each guest operates independently of the other guests and perceives that it has the entire system to itself as it executes its programs. Actually, the memory and I/O resources are divided up among the guests. Some resources are shared, and other resources are dedicated to a particular guest. Generally, the one or more CPUs in such a system are shared on a time-slice dispatched basis, although it is possible to dedicate a CPU to a particular guest.

In interpretive execution mode, each of the plural guests perceives that it has its own "real memory", which it uses for the execution of its programs. Each guest's perceived "real memory" is a part of the system's actual real memory (also called "host memory"). Each guest's real memory is mapped into a host virtual memory, from which its addresses can be translated into host real addresses. Thus, a guest's real storage is a part of the host real storage. Essentially, two kinds of mapping are possible: fixed and dynamic. In fixed allocation, a subset of the host real storage is allocated for the guest on a one-for-one basis. The real storage of the guest is dedicated, but its actual host real addresses may be different from what the guest perceives.

An alternative to using a host large virtual address for a V=R or V=FC guest is to map guest real directly onto host real storage. Either mechanism provides the needed constraint on invalid guest CPU accesses.

There are two types of fixed allocations provided in prior art, called respectively, Virtual=Real (V=R) and Virtual=Fixed (V=F). In V=R, the host real addresses of guest real storage are identical to the guest values; only an address limit check is required to constrain the guest to its own storage. Obviously, there can only be one V=R guest in a system. In V=F allocation, a guest real storage is assigned a contiguous set of host real address values equal in size to that assumed by the guest operating system. In guest real to host real address translation (V=F guest), an offset must be applied to the guest real addresses. An address limit check is also necessary. There can be many V=F guests in a system, limited only by the amount of host storage.

The above described guest addressing is disclosed in U.S. Pat. No. 4,843,543 to G. H. Bean et al, assigned to the same assignee as the subject application.

Dynamic allocation of host real storage allows the host to allocate a portion of its real storage to be shared among a set of guests whose performance priority does not require them to be afforded a fixed allocation. For example, such allocation has been judged sufficient for guests that are primarily interactive, with human think time involved in those normal operating scenarios. The dynamic allocation is often called Virtual=Virtual (V=V). Here, allocation occurs at the level of the allocated storage unit of the host, called a page, and the pages of a guest are not assigned to host real until required. The pages assigned for V=V use are allocated by page on demand to execute guest operating systems, and there is no address contiguity requirement. While the guest assumes it has fixed contiguous real storage (the guest virtual storage) assigned for its use, the guest real storage is actually mapped to host virtual storage, and the hypervisor architecture translates guest real addresses through host DAT tables to find the guest page in host real storage. Since assignment is dynamic, page faults are expected in V=V operation (they never occur in V=R or V=F), which causes the host to assign a host page to the referenced guest page, and causes reexecution of the faulting guest instruction. There can be essentially an unlimited number of V=V guests in a system, concurrently.

In the prior art IBM systems, the host and guest virtual memory, and host and guest real memory, each used 31 bit addresses. This invention is concerned with problems caused when the size of these host/guest addresses is greater than 31 bits, and compatibility is desired with programs using the prior 31 bit addresses to enable such prior programs to run on a system using greater than 31 bit addressing (herein called "large addressing").

Large real addressing for a computer system is described and claimed in U.S. patent application Ser. No. 07/754,810 filed on Sep. 4, 1991, and assigned to the same assignee as this application. This application describes how 31 bit guest real addresses can be transformed into larger than 31 bit host addresses, e.g. 63 bit addresses.

Large virtual addressing for a computer system is described in U.S. patent application Ser. No. 07/803,320 now U.S. Pat. No. 5,381,537 filed on Dec. 6, 1991. This application describes how large virtual addresses can be address translated into real addresses using existing translation tables using 31 bit addresses, after which the resulting 31 bit real addresses can be transformed into large real addresses using the teachings of U.S. application Ser. No. 07/754,810.

All of the subject matter of prior-filed applications Ser. Nos. 07/754,810 and 07/803,320 now U.S. Pat. No. 5,381,537 is incorporated herein by reference.

Application Ser. No. 07/754,810 discloses and claims large real addressing (greater than 31 bits, e.g. 63 bits). A resulting real address (i.e. the translated address) obtained from an address translation of a large virtual address (LVA) by the invention in Ser. No. 07/803,329 now U.S. Pat. No. 5,381,537 may be provided as a large real address (LRA) by using the invention in application Ser. No. 07/754,810.

Application Ser. No. 07/803,320 now U.S. Pat. No. 5,381,537 enables the translation of large virtual addresses (LVAs) greater than 31 bits, e.g. 63 bits. The LVAs are generated from instruction operands using large base registers and large size address arithmetic circuits using novel methods and means for handling the part of the address greater than conventional size in combination with conventional types of translation tables to obtain the translation of LVAs into either a small (i.e. conventional size) real address (RA) or a large real address (LRA).

U.S. Pat. No. 4,355,355 (Butwell et al) first disclosed access registers (ARs) for identifying the virtual address space containing an operand. The AR is associated with the base register used in generating the operand. An STD (segment-table designation) is provided as the content of the AR and may be considered an extension of the virtual address of the operand.

U.S. Pat. No. 4,979,098 (Baum et al, PO9-87-004) discloses providing an ALET (access list entry token) in an AR to provide indirection between the AR and the STD associated with the AR. The ALET is comprised of an ALEN, ALESN and P control bit. This indirection secures the AR-associated STD for a user using the AR. AR translation (ART) uses the ALEN (access list entry number) within the ALET in the AR to access an access-list entry (ALE) in an AL (access list) which addresses an ASTE (ASN second table entry) which contains the associated STD.

Application Ser. No. 07/577,395 discloses the Multiple Controlled Data Space (MCDS) Facility which provides common access to data spaces by multiple virtual machine guests emulated on a host computer system. This facility provides MCDS guests, which are a special form of V=V guests that operate without guest DAT and have access, by means of ALET-qualified 31-bit guest real addresses, to data spaces created and managed by the host. The ALET-qualified 31-bit guest real addresses are contained in access and general register pairs, and are translated through host ART and DAT processes and tables to find the data pages in host real storage.

SUMMARY OF THE INVENTION

This invention deals with providing a new method of raising the limit on the size of virtual and real addresses in a machine which may be running in host/guest mode. For contrast, native mode addressing in a computer system provides a single-level of address transformation by dynamically translating each virtual address to a real address. Prior art guest addressing in interpretive-execution mode provides two-levels of address transformation, including DAT availability at each level. Offset transformation is commonly used for preferred guests (e.g. V=F guests), instead of DAT transformation, at the host level.

With this invention, a large virtual address (LVA) and/or a large real address (LRA), e.g. 47 or 63 bit size, may be used at either the host level or guest level.

This invention modifies the current access register (AR) architecture, and applies the modified architecture to guest large addressing.

This invention allows a computer system to allocate respective parts of one or more host large virtual address spaces (LVASs) to its guests for containing the respective guest large real address spaces (LRASs), and to allow the host to transform large real addresses provided by the guests into the host's large real address space (LRAS). In this transformation process, guest real addresses are mapped into host virtual addresses. The second step of transformation is from a host virtual to a host real memory address. This transformation is typical of V=V guests. For V=R and V=F guests, guest real addresses are mapped directly into host real addresses.

The guest may use any of small or large virtual addresses, small or large real addresses, or ALET-qualified small real addresses. If a guest's program uses small virtual addresses (VAs) or small real addresses (RAs), the guest uses the facilities described in application Ser. No. 07/754,810 to transform the resulting guest RAs into guest LRAs. If a guest's program uses large virtual addresses (LVAs), the guest uses the facilities described in application Ser. Nos. 07/803,320 now U.S. Pat. No. 5,381,537 and 07/754,810 to transform the guest LVAs into guest LRAs. These resulting guest LRAs become host LVAs in a host LVAS.

Then the host uses the facilities described in application Ser. Nos. 07/803,320 now U.S. Pat. No. 5,381,537 and 07/754,810 to transform these host LVAs into host LRAs, which are used to access the actual memory in the computer system with the controls described in this invention. If a guest's program uses ALET-qualified small real addresses (ALET-qualified RAs), the guest uses the facilities described herein to transform these qualified guest real addresses into host LRAs.

The invention in the subject application provides a unique interface between each guest and the host for controlling these address transformations in a manner tailored to the respective guest.

The invention provides two novel methods for supporting the host virtual addressing means. One method maps all guests large real address spaces (guest LRASs) into a single host large virtual address space (host LVAS) using one set of host access list entries (host ALEs). The one set of host ALEs can be located in one or more host access lists (host ALs). When the host LVAS is very large, multiple ALs of the single set of ALEs can be used. The proper AL containing the ALEs for a particular guest is provided to the means and found by it. A single guest must be contained in the ALEs of a single AL.

The other method uses a separate set of host ALEs for each guest large real address space (guest LRAS). These separate sets of host ALEs might comprise a single host LVAS, or might comprise multiple distinct host LVASs.

The invention provides a control block for each guest. The guest's control block (GCB) provides several inventive features herein which are supported by unique fields therein. For example, a feature of the invention includes means using the GCB to define the respective "guest large memory" that can be set to any amount of storage for the guest over a very wide range. Another feature allows a guest to execute programs using conventional small addresses (virtual and real) and extend them to guest large real addresses (guest LRAs) for accessing in the guest's large memory (also defined within the GCB). Still another feature maps the guest large real addresses (guest LRAs) into host large virtual addresses (host LVAs). A further feature provides various means of address transformation between a host LVA (for a guest) and the host large memory (which is the system's actual memory).

A guest has the options of: 1. executing programs using small virtual or real addresses (VAs or RAs such as found in current programs), or 2. executing programs using large virtual or real addresses (LVAs or LRAs), or 3. executing programs using MCDS ALET-qualified small real addresses (RAs). In all cases, the guest VAs or RAs are transformed into host large real addresses for accessing the system's actual large memory.

Although this invention can extend the virtual address limit of the host mapping of guest real storages by using an address with up to 64 bits, it is particularly adaptable to 47 bit logical addresses because of the ESA/390 access register architecture, which effectively provides an ALEN-qualified 31 bit virtual address limit and a 31 bit real address limit. An ESA/390 31 bit virtual address (VA) is generated from a B,X,D operand field or is provided from a PSW instruction address field. And, a 16 bit ALEN in an AR is used to obtain the translation table (representing a 2 GB VAS) in which the 31 bit VA is translated. Thus, a 31 bit VA and a 16 bit ALEN provide a total of 47 bits to support a 31 bit VA and a 31 bit RA.

This invention extends logical DAT-ON (virtual) addressing by the host of guest real storage BEYOND the 2 GB limit, up to a limit of 263 bytes for an LVAS (large virtual address space) while maintaining upward compatibility from current ESA/390 access register (AR) architecture. With a 47 bit constraint, this invention can use the current ART (access register translation) and the current DAT (dynamic address translation) architecture. A 47 bit large virtual address (LVA) can locate any byte in up to a 247 byte LVAS (LVA space), which has a size up to 65,535 times the current 2 GB address space limit.

In the interpretive execution mode of a CP, the guest control block may be an ESA/390 SIE SD (start interpretive execution State Description) block, which represents a VM (virtual machine) modified to allow host ALs (access lists) to contain plural LRAS representations, so that plural (or all) guest real address spaces can be mapped into one set of ALEs by providing an AL OFFSET field in each guest's SIE SD to locate the first ALE for the guest's LRAS.

DETAILED DESCRIPTION OF THE EMBODIMENTS

Figure 9:
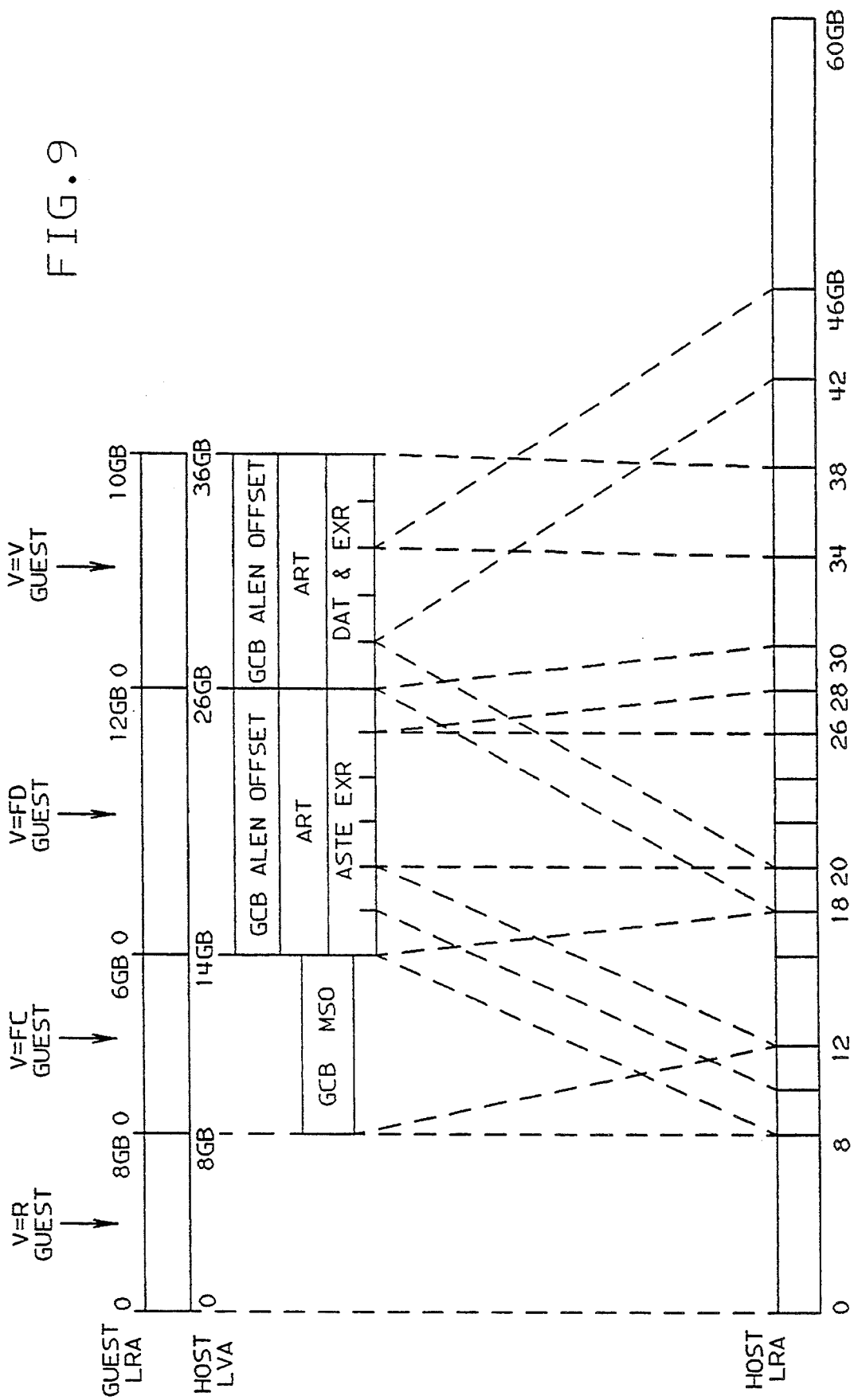
FIG. 9 is a diagram showing how different guests (V=R, V=FC, V=FD and V=V guests) using large real addresses (guest LRAs) in guest large real address spaces (guest LRASs) are mapped into the host large real address space (host LRAS).

Large Addressing for Different Types of Guests—FIG. 9

As an example, four different types of guests are represented in FIG. 9, which are a V=R guest, a V=FC guest, a V=FD guest, and a V=V guest. The definition of each type of guest is uniquely characterized by the manner in which the guest's real address space is translated into a subset of the host's real address space. Each of the guests, one of each type, represented in FIG. 9, has a guest real address space (guest LRAS) which has a memory size exceeding 2 GB. Each guest has a linear real address space shown as an integer multiple of 2 GB, beginning with address 0 and ending with an address greater than 2 GB.

The V=R guest has a 8 GB guest real memory, the V=FC guest has a 6 GB guest real memory, the V=FD guest has a 12 GB guest real memory, and the V=V guest is allocated 10 GB of host real storage. Since V=V guest real addresses are translated through host segment and page tables and since page faults are allowed, there need be no correlation between the size of the V=V guest real storage sizes and the size of host storage allocated for dynamic use by this type of guest. Instead, this relationship is determined by performance expectations. The host real memory (the host LRAS which is the actual system memory) is represented as beginning with 0 and ending with a 60 GB size. In this embodiment, the host LRAS may be any amount up to 2**63 bytes (for 63 bit real addresses). Each guest LRAS may be any size as long as the total guest space (for all non V=V guests) mapped into the host LRAS does not total more than the host LRAS.

The host has a large real address space (host LRAS) which can be any amount up to 2**63, which is the host address size in this embodiment. In FIG. 9, the host is shown as having an LRAS exceeding 36 GB, in which all guests are mapped into a single host virtual address space between 0 and 36 GB. Thus the V=R guest's 8 GB LRAS is mapped into the part of the host's LRAS between 0 and 8 GB, the V=FC guest's 6 GB LRAS is mapped into the part of the host LRAS from 12 to 18 GB, the V=FD guest's 12 GB is mapped into the part of the host LVAS from 14 to 26 GB (host LRAS from 8 to 12, 20 to 26 and 28 to 30 GB), and the V=V guest's 10 GB is mapped into the part of the host LVAS from 26 to 36 GB (host LRAS from 18 to 20, 42 to 46 and 34 to 38 GB).

Only one V=V guest is shown in FIG. 9 as an illustration. As previously explained, the nature of a V=V guest is that the host timeshares a portion of the host real storage among many such guests, doing dynamic allocation to meet the demands of the programs actually executing at any one time. Each V=V guest occupies a unique portion of a host LVAS, (or possibly occupies a unique host LVAS of its own) but its pages, when assigned to real storage are allocated in the same range of host real storage as any other guest, i.e., in FIG. 9 they will all be backed by pages in the range of 18–20 GB, 42–46 GB, or 34–38 GB, the host allocated area to back all V=V guest real pages.

Although not shown in FIG. 9, MCDS ALET-qualified guest real addresses are mapped into host AR-specified virtual addresses. These addresses are subsequently mapped into host real addressing through the use of host ART and host DAT using the teachings of U.S. patent application Ser. No. 07/754,810.

When multiple guest LRAs are mapped into a single AL, the host may access each of the multiple guests using the appropriate access-list entries (ALEs) representing a particular guest. This is accomplished by using the conventional ART process using control registers loaded by the host. Alternatively, using the methods and means described in application Ser. No. 07/803,320, now U.S. Pat. No. 5,381,537, the host may concatenate multiple ALs and view this as one LVA. In this case, the access-list origin (ALO) is contained in the access-directory entry (ADE) as described in application Ser. No. 07/803,320 now U.S. Pat. No. 5,381,537.

FIG. 9 represents the way each of the guest assigned parts of a host LVAS is address translated onto the host LRAS. It is noted that the different types of guests translate differently onto the host LRAS. The V=R guest occupies the first 8 GB of the host memory in a one-for-one address translation relationship, and the V=R guest must start from host real address 0. The V=FC guest's 6 GB LRAS also occupies a 6 GB of host LRAS in a one-for-one address translation relationship, but starts at an offset of 12 GB from the host's real address 0 in the host memory to map between 12 GB and 18 GB in the host LRAS. Thus the V=R and V=FC guest LRAS must each map into contiguous portions of the host LRAS.

However, the V=FD and V=V guests each may map discontiguously into the host LRAS. The V=FD guest's 12 GB LRAS is shown mapped into three discontinuous parts of the host LRAS, from host large real addresses (LRAs) 8 to 12 GB, from host LRAs 20 to 26 GB, and from host LRAs 28 to 30 GB. The granularity of allocation is the addressability covered by a single ALE, 2 GB. The V=V guest's 10 GB LRAS is mapped dynamically into 4 KB page frames anywhere they are available and assignable in the part of the host memory allocated for the V=V guests. Hence these page frames may be scattered anywhere in the host memory without any loss of guest real addressability or any loss in memory access time. In FIG. 9, the V=V guest 10 GB LRAS is shown as mapped into discontiguous groups of pages located between host LRAs 18 to 20 GB, 42 to 46 GB, and 34 to 38 GB.

Figure 1:
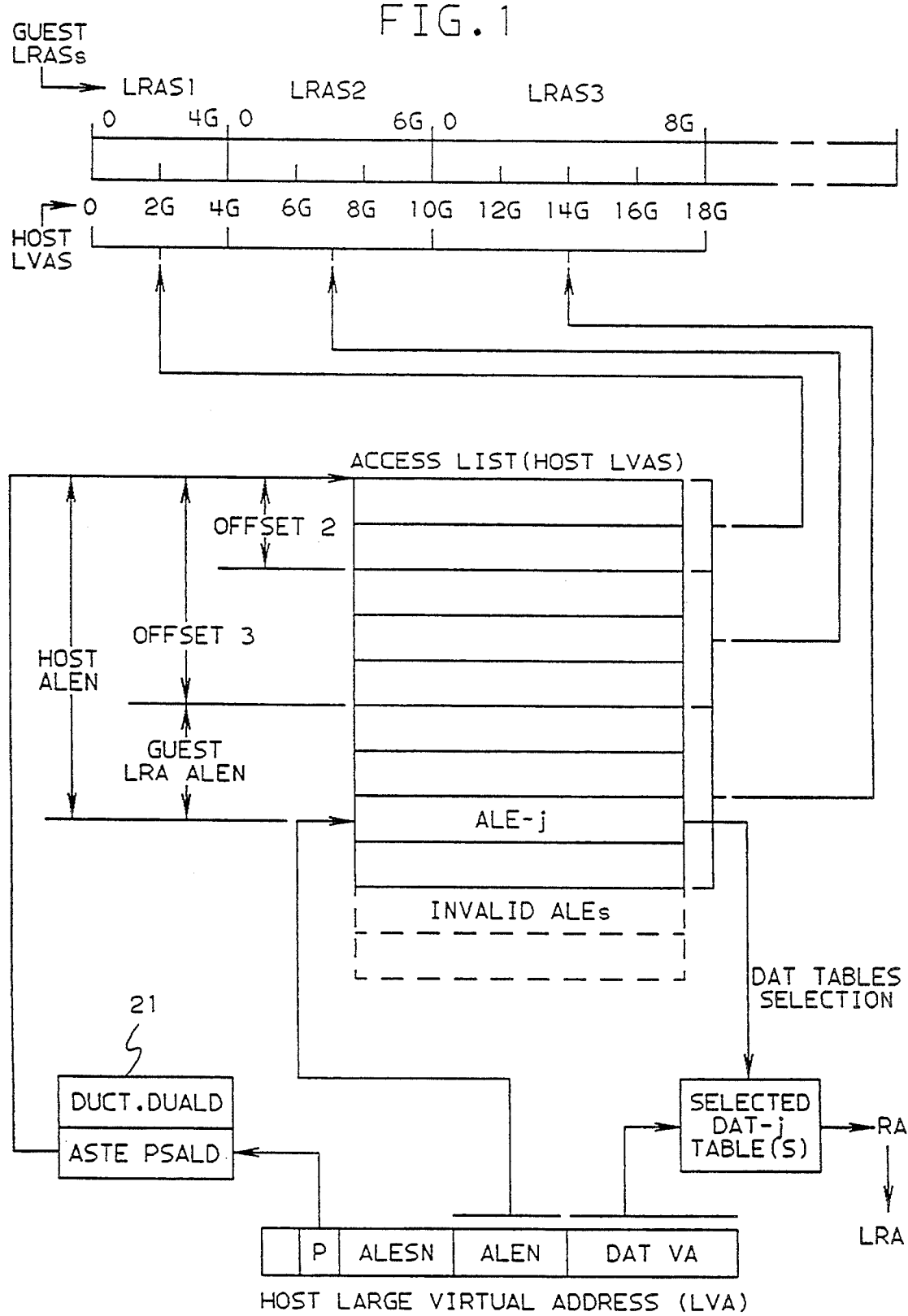
FIG. 1 represents one method in which the large real address spaces of different guests (mapped onto a host virtual address space) are handled by a single access list (AL) used for multiple guests.

How the guest-to-host LRA mapping is accomplished for the different types of guests in the preferred embodiment is explained hereafter using the remaining FIGS. 1 though 8, which disclose the preferred embodiments for the respective types of guests.

Guest Large Addressing Fundamentals

In the embodiments of this invention, a respective guest control block (GCB) is provided in system memory to represent each guest.

The GCB may be accessed by using the start interpretive execution (SIE) instruction in the IBM ESA/390 architecture. The SIE instruction has the address of a state description (SD) as its operand; the SD is a GCB. The SIE instruction is used to start the execution of a virtual machine (VM) guest in a computer system. The fields in the SIE SD are presumed to be the fields in each GCB in the preferred embodiments described herein, except where a specific GCB field is specified herein.

The GCB contains a guest type field which identifies the guest as a: V=R, V=FC, V=FD or V=V type, which controls the manner of address translation used to map each guest's LRAS onto the host's LRAS. The different guest types use different manners of host address translation for mapping the guest LRAs into subsets of the host's LRAS. Each GCB has many other fields which support the address translation for a particular type of guest.

Host Large Virtual Address Space (LVAS) Representation

Figure 2:
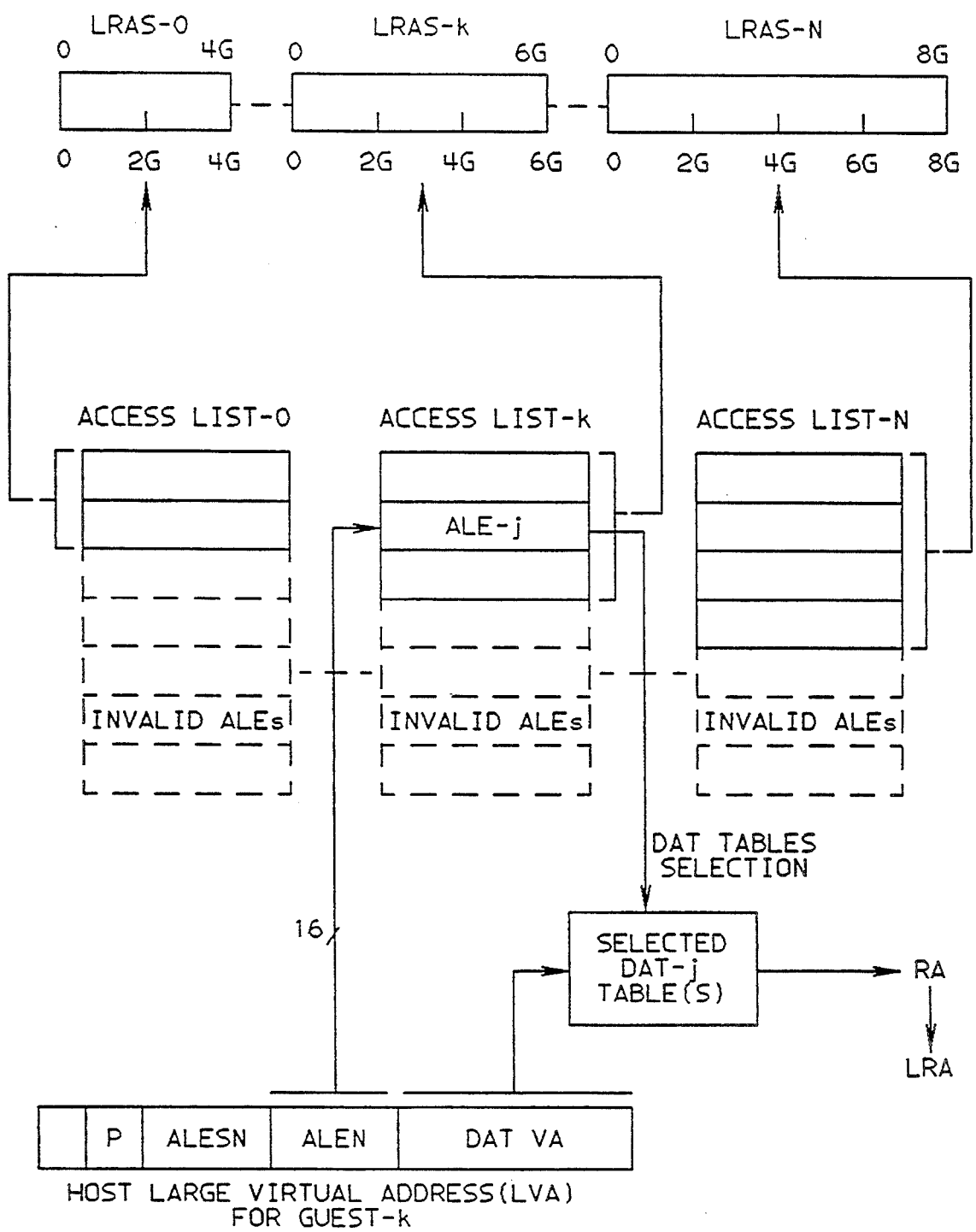
FIG. 2 represents another method in which the large real address spaces of different guests (mapped onto a host virtual address space) are handled by a plurality of different access lists (ALs), one AL for each guest.

FIGS. 1 and 2 respectively provide two different methods for representing a host large virtual address space (LVAS), into which small and guest large real addresses (guest RAs and guest LRAs) are mapped. This guest LRA plus the amount corresponding to the ALEN offset is the host large virtual address (host LVA). This host LVA is then translated into a host large real address (host LRA), using the method specified for that guest, before the guest's address (representing a guest data access request) can access the requested data in the computer system memory.

Either method can represent a host LVAS for all of the different types of address translation methods used by V=V and V=FC type of guests for mapping every guest LRAS into a single host access list (AL) or into multiple host ALs. Each guest LRAS is superimposed onto a contiguous part of a host LVAS.

The method represented in FIG. 1 assigns to each guest a different contiguous part of a host access list (host AL), so that a single host AL provides a host LVAS for multiple guest real storages.

The method represented in FIG. 2 assigns a different host AL to each guest, so that plural host ALs provide a single host LVAS or multiple host LVASs. The ALs may be connected through an access directory (AD) for host addressing of all guests. This mechanism is described in application Ser. No. 07/803,320, now U.S. Pat. NO. 5,381,537. A combination of FIGS. 1 and 2 providing multiple ALs, each mapping multiple guest real storages is evident, and is not shown. Still, another approach of mapping guest storage into multiple host LVASs, each represented by one or more ALs (possibly connected through an access directory (AD)), is evident and not shown.

Both methods fundamentally use the LVAS method disclosed and claimed in application Ser. No. 07/802,320 now U.S. Pat. No. 5,381,537 in which each entry (ALE) in an AL represents a different part of the SAME host large virtual address space (LVAS). In the method of FIG. 1, a host LVAS is represented by contiguous ALEs in a single AL. Each guest is assigned a subset of contiguous ALEs accessed in the AL by a different offset for each respective guest.

In the method of FIG. 2, a host LVAS is represented by a plurality of contiguous ALEs in a sequence of ALs used by multiple guests. Each guest is assigned a different AL and there is no offset.

In each preferred embodiment herein, upward compatibility is maintained from the IBM ESA/390 and IBM System/370 architectures by choosing each ALE to represent a 2 GB part of a host LVAS. In ESA/390 and System/370, each ALE in an AL represents a DIFFERENT virtual address space. With the subject invention, all ALEs in a host AL can be in the SAME host virtual address space. In the preferred embodiments and in ESA/390 and System/370, each ALE represents a translation table (e.g. segment table) that represents virtual address space of up to a maximum of 2 GB. This use of the current 2 GB translation tables obtains upward programming compatibility of the embodiments from the ESA/390 and System/370 architectures, i.e. the old translation tables can be used with this invention.

For some guest types, even though guest real storage (RA or LRA) may be mapped into host virtual the mapping into host virtual is not used in the translation of guest real to host real during guest operations. This is done to provide better performance to preferred guests.

Multiple Guests Being Assigned to Same Access List—FIG. 1

FIG. 1 shows the first method of representing a host large virtual address space (host LVAS). This method maps multiple guest large real address spaces (guest LRASs) into ONE access list (AL) that represents a single host LVAS.

Each guest LRAS is mapped into a subset of contiguous ALEs in the AL, and begin at a predesignated offset in the AL. Each ALE in the AL represents a 2 GB address range within the host LVAS on 2 GB boundaries.

Each guest is assigned a different offset in the AL. The first guest in FIG. 1 is assigned an offset of zero.

The number of ALEs assigned to each guest's LRAS is the guest's LRAS size in 2 GB units, rounded to the next higher integer multiple of two. Thus each guest's assigned subset of ALEs provides an address range in the host LVAS which is an integer multiple of 2 GB.

FIG. 1 illustrates three guests having guest LRASs of 4 GB, 6 GB and 8 GB, respectively. In this example, the first guest uses 2 ALEs, the second guest uses 3 ALEs, and the third guest uses 4 ALEs.

No overlapping ALE(s) are provided between guests having adjacent subsets of ALEs.

Adjacent subsets of ALEs in the AL need not be separated by any invalid ALEs between them. But one or more invalid ALEs may separate adjacent subsets (such as to reserve future expandable space for a guest at the high end of its address range), which is not shown in FIG. 1. All ALEs not assigned to a subset may be set invalid; note the invalid ALEs shown toward the bottom of the AL in FIG. 1, and valid ALEs near the top of the AL.

In FIG. 1, the host LVAS is represented in the illustrated AL in accordance with the description provided in application Ser. No. 07/803,320 now U.S. Pat. No. 5,381,537. In that application, the ALEN part of a large virtual address (LVA) may be generated and provided by address arithmetic circuits without the use of access registers (ARs). Alternatively, the ALEN part of the LVA in FIG. 1 may be generated by an operating system for use in addressing without the use of address arithmetic circuits. In an LVA, the ALEN field is the set of bits in the next higher-order part of an LVA to the left of the lowest-order 31-bits of the LVA. Application Ser. No. 07/803,320 now U.S. Pat. No. 5,381,537 explains that the ALEN can have any reasonable size within the LVA.

The number of bits in the ALEN determines the maximum number of ALEs in the AL. For example, in a 47 bit LVA, the ALEN field may occupy its highest-order 16 bits, which enables the AL to contain up to 65,536 ALEs (216) to represent a host LVAS with a capacity of up to 247 bytes. Any AL can use fewer than its maximum number of ALEs by setting all unused ALEs to an invalid state (i.e. by setting a valid bit off in each invalid ALE). Invalid ALEs are shown as cross-hatched in the FIGURE. Because MSE is checked before indexing into the host AL, the AL need not be extended with invalid entries to represent storage not made available to the guest. This can result in substantial savings in storage.

The guest LRA (guest large real address) of a guest is used to select an ALE-j in the subset of ALEs assigned to that guest. This is done by first selecting an ALEN field in the guest's LRA. Then, the ALEN part of the guest's LRA is added to the respective guest's offset (defined as a predetermined number of ALEs). The result of this addition is the generation of a host LVA that contains an ALEN which indexes from the beginning of the host AL to the required ALE-j for the guest. It is this host LVA which is illustrated in FIG. 1 for the guest having offset 3. The low-order 31 bits (DAT VA part) of the host LVA is the same as the low-order 31 bits of the guest LRA. This illustrates the host LVA generation used by the first method described in this specification.

Generally, the addressing hardware makes a test during this ALEN indexing operation to assure the ALEN does not exceed a "guest extent" which is the maximum number of ALEs assigned to the respective guest. This test limits the size of each guest LRA to a smaller size than is available in the number of bits being used for a guest's LRA. The host does not have this test since the host must be able to access any ALE in the AL.

The required ALE-j accessed for a guest is used to address a translation table DAT-j (which may be a conventional type of address translation table). The (DAT VA) address to be translated is a 31 bit conventional host virtual address (VA).

The AL used by the host may be selected through table 21 in FIG. 1 having two entries, "DUCT.DUALD" and "ASTE.PSALD" in which the "ASTE.PSALD" may be used to locate the host AL, as exists in the prior art found in the current IBM ESA/390 architecture. The state of the P bit in a current host LVA selects the AL used for the LVA translation. Alternately, using the method and means of application Ser. No. 07/803,320 now U.S. Pat. No. 5,381,537, the host may concatenate multiple ALs and view all guests in a single host LVAS. In this case, for host addressing, ALO is contained in ADE, as described in application Ser. No. 07/803,320 now U.S. Pat. No. 5,381,537.

Each Guest Being Assigned to a Different AL—FIG. 2

FIG. 2 shows a second method of representing a host LVAS, which uses a plurality of separate access lists (ALs)—a separate host AL for each guest. The separate ALs for the respective guests may be specified in two different ways for the host's own access of guest storage: 1. By having the operating system set up addresses for the separate ALs, and use the current ESA/390 access register architecture to access the respective AL for a current guest. 2. By using an access directory (AD) of the type defined in application Ser. No. 07/803,320 now U.S. Pat. No. 5,381,537 to represent all ALs of a host LVAS. In this case, for host addressing, ALO is contained in an ADE.

FIG. 2 (as in FIG. 1) provides each guest with a large real address space (LRAS) with a range of addressing that starts from guest real address zero and ends before or at any 2 GB addressing boundary. Each guest's LRAS is associated with a respective AL having its first N number of ALEs respectively assigned to the sequence of 2 GB address segments within the guest's LRAS. Thus the number of ALEs assigned to each guest's LRAS is the guest's LRAS size in 2 GB units.

In FIG. 2, AL-O through AL-N are assigned to guests O through N. Each of the illustrated three ALs represents a different size guest LRAS: 4 GB, 6 GB and 8 GB, respectively.

All of AL-O through AL-N may be mapped into a host LVAS by the valid entries (ADEs) in an access directory (AD) of the type described in application Ser. No. 07/803,320 now U.S. Pat. No. 5,381,537, in which the ADEN and ALEN parts of a host large virtual address are generated by address arithmetic. The ADEN is a set of bits in the highest-order part of the LVA, and the ALEN is a set of bits in the next highest-order part of the LVA. The lowest-order part of the LVA is its DAT VA part. That application explains that the ADEN and ALEN can each have any size within the LVA, in which their concatenation determines the maximum number of ALEs that can represent an LVAS. In this mechanism, ALO is contained in the ADE.

Figure 10:
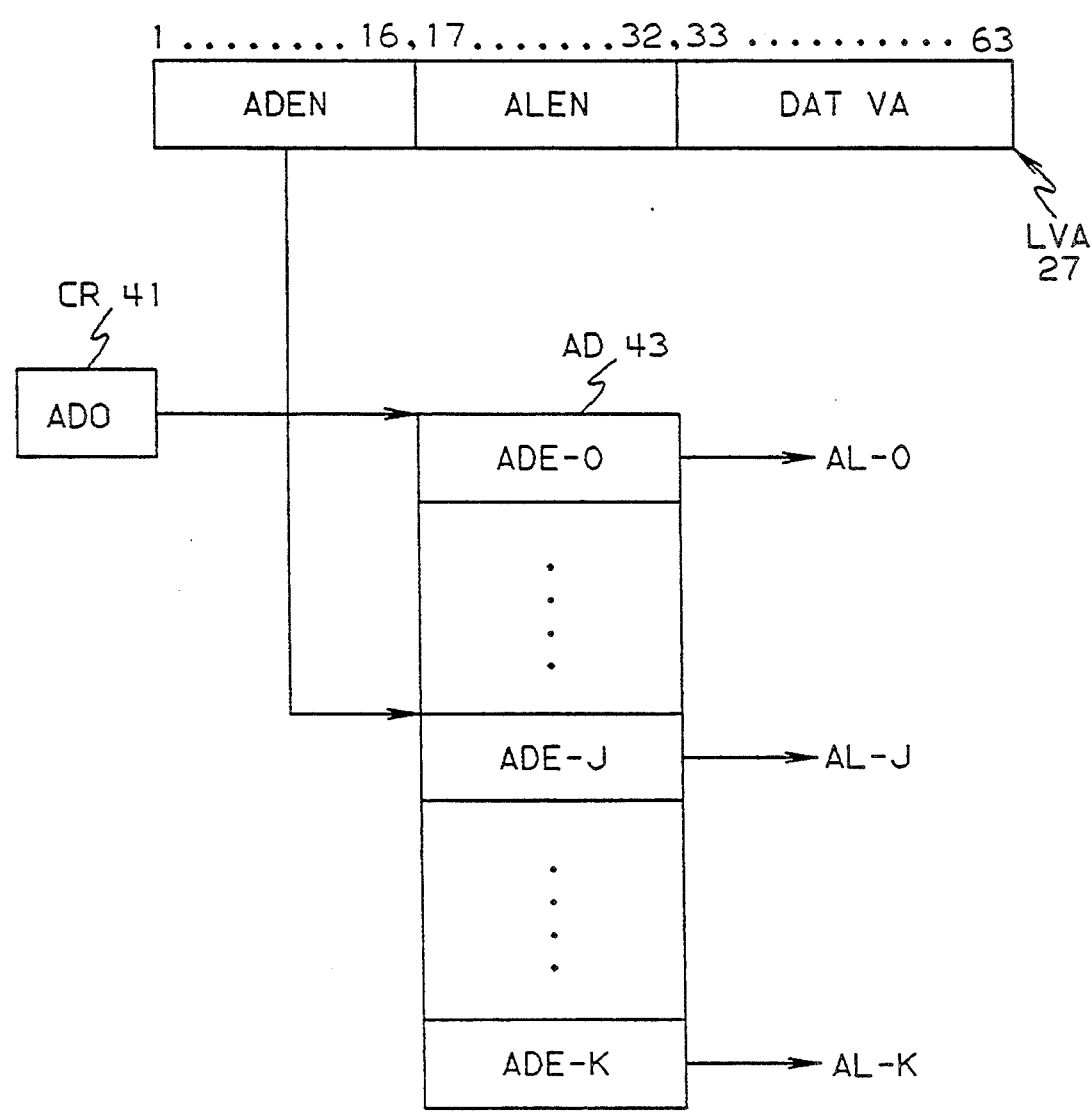
FIG. 10 shows an AD (address directory) addressed by an ADEN (access list entry number) field in an LVA.

For example in a 63 bit LVA as shown in FIG. 10, a highest-order 16 bit field in the LVA is assigned as the ADEN field, which can support up to 65,536 ALs (and up to 65,536 guests). The next lower-order 16 bit field in the LVA is assigned as its ALEN field, which enables each AL to have a maximum size up to 65,536 ALEs (for supporting up to 131,072 GB of contiguous addresses for each guest). Any AL need not be assigned to any guest. And any AL assigned to a guest (or to the host) can activate fewer than its maximum number of ALEs by setting currently unused ALEs to an invalid state, e.g. by setting a valid bit off in each invalid ALE.

In FIG. 2 for example, AL-k may be assigned for the use of guest k, and AL-k may be addressed by the 47 bit LRA provided by the guest k. The high order 16 bits of the LVA being used by the host determine the ALO of the AL defining the virtual machine real storage. Then, ALE-j is selected in AL-k by using the ALEN in the host LVA for guest-k (guest LRA) as an index in AL-k. The selected ALE-j contains an address used in a conventional process for locating a particular translation table(s) DAT-j (which is presumed to be a conventional type of address translation table). This translation table is then used to translate the low-order 31 bits of the same host LVA being provided for the current guest-k LRA to obtain a translated address for that LVA. The obtained address to be translated may be an LRA, or it may be a 31 bit RA which may be made into an LRA using the means and/or method described and claimed in patent application Ser. No. 07/754,810.

As in FIG. 1, the number of bits in the ALEN field determines the maximum number of ALEs in the AL. For example in a 47 bit LVA, the ALEN field may occupy the highest-order 16 bits in the LVA, which enables the AL to contain up to 65,536 ALEs ($2^{}16$) to represent a host LVAS having a capacity of up to $2^{}47$ bytes. Any AL can use fewer than its maximum number of ALEs by setting all unused ALEs to an invalid state (i.e. by setting a valid bit off in each invalid ALE). Invalid ALEs are shown as cross-hatched in FIG. 1.

The LRA (large real address) of a guest is used to select an ALE-j in the host AL for that guest. This is done by first selecting the ALEN field in the host LVA representing the guest's LRA. Then, the ALEN part of the host LVA is used as an index from the beginning of the selected host AL-k to locate the required ALE-j for that guest. The low-order 31 bits (DAT VA part) of the host LVA is the same as the low-order 31 bits of the guest LRA, which is used for the final part of the address translation in address translation tables accessed through ALE-j. This illustrates the host LVA generation used by the first method described in this specification.

The addressing hardware test described for FIG. 1 during the ALEN indexing operation is not essential in the method of FIG. 2 as in the method of FIG. 1. This is because in FIG. 2, an over-reaching ALEN will not likely access a valid ALEN assigned to another guest, as it would in FIG. 1, and will likely access an invalid ALE (a CPU will only process an expected ALEN size). However, it still may be desirable to use this test to assure that the ALEN does not exceed the "guest extent", which is the maximum number of valid ALEs contiguous from the top of the AL assigned to the respective guest. This test limits the size of each guest LRA.

The required ALE-j accessed for a guest is used to address a translation table DAT-j (which may be a conventional type of address translation table). The translation table is then used to translate the low-order 31 bits of the same host LVA to obtain the translated address. This translated address may be an LRA, or it may be a 31 bit conventional RA (which is not an LRA) that may be made into an LRA using the method and/or means described and claimed in patent application Ser. No. 07/754,810.

If a host-created LVAS, onto which multiple guest real address spaces are mapped, contains consecutive ALEs within a single AL, then the host may address and access these multiple guests in a single virtual mapping with the current ESA/390 architecture, where the P bit is checked and the appropriate ALO is used to access the AL. Alternately, if the host created LVAS, onto which multiple guests are mapped, contains multiple ALs, then the host may address and access these multiple guests in the single mapping with the methods and means described in application Ser. No. 07/803,320 now U.S. Pat. No. 5,381,537. In this case, multiple ADEs, each representing one AL, are concatenated and ALO is contained within the ADE. P bit checking is not performed to determine ALO, instead, the ALO contained in the ADE is used to access the appropriate AL.

Note that when the guest LRA (for example, 47 bits) is translated, the ESA/390 architecture is used to determine the AL. Only if the host-created LVAS is larger than can be contained within one AL, and if the host needs to access all guests within one LVAS, the host may operate in a mode described in application Ser. No. 07/803,320 now U.S. Pat. No. 5,381,537 to translate the host accesses.

Other Methods of Selecting Among Plural ALs

Alternatively, AL-O through AL-N may be addressed by any means provided by the operating system. For example, a control register may be used to directly select AL-k for use by guest k when guest k is dispatched without an AD, and without any ADEN field being defined in the host LVA. In such case the high-order address field in the LVA may be entirely used as the ALEN field (to potentially access among a very large number of ALEs in the AL-k).

As described in application Ser. No. 07/803,320 now U.S. Pat. No. 5,381,537, the ALEN part of the LVA may be generated by arithmetic circuits and not use any access register (AR), or the ALEN may not be generated by address arithmetic and be contained in an AR that locates ALE-j in the selected AL-k.

Guest Definition in a Host System

Each of the guests in the preferred embodiments is defined by a guest control block (GCB) located in the system memory. The GCB is modelled after the SD (state description) control block accessed through the SIE (start interpretive execution) instruction in the IBM ESA/390 and S/370 architectures. Most of the fields in the GCB are the same as fields previously provided in the SIE SD. One field defines the type of guest assigned to a respective SD. Likewise, a guest type field A is provided in each GCB.

Other fields in some GCBs are a "main storage extent" (MSE) field B, which specifies the maximum main storage address range usable by the guest. An ALEN offset field is defined for V=V and V=FD guests. These fields are used for guest real address translation to host addresses.

In the embodiments described here, the term "main storage extent" (MSE) is used to denote the size of guest main storage for all types of guest.

Memory Section and Memory Page Address Translation

In the embodiments described herein, a "small memory" is a memory having a capacity of less than or equal to 2 GB, whether it is a virtual memory or a real memory. And a "large memory" is a memory having a capacity larger than 2 GB, whether it is a virtual memory or a real memory.

Each V=FD or V=V guest (in the embodiments described in this application) is assigned an exclusive contiguous addressing range in a host large VIRTUAL memory. The assigned guest address range is a contiguous section of a host large virtual address space which is an integral multiple of 2 GB, which may range from one 2 GB unit to a large multiple of 2 GB units. In general, during guest operation, guest real addresses are translated to host real addresses by converting them to unique host virtual addresses and then to host real addresses by one of four methods, depending on guest type. However, certain steps of host virtual to host real translation are bypassed during guest operations in order to provide improved performance in their operations. In host mode, they may still be accessed by the host in its virtual storage by conventional means described in ESA/390 architecture and in application Ser. No. 07/803,320 now U.S. Pat. No. 5,381,537.

A preferred guest (i.e. V=R, V=FC or V=FD guest) is assigned a section of the host large real memory. However, each non-preferred guest (i.e. each V=V guest) is not assigned a contiguous section of the host large REAL memory. Instead, a non-preferred guest is assigned 4 KB page frames in real memory where ever unassigned page frames exist in the real memory at the time the page tables are set up for the guest; hence a non-preferred guest's assigned page frames may be non-contiguous in the real memory.

Some preferred guests (e.g. V=FD guests) only require "memory section address translation" for translating its guest LRA into a particular 2 GB section of a computer's large memory (which is the host LRAS). Thus V=FD guests may use non-contiguous 2 GB sections of the large real memory.

However, the page frames assigned to any non-preferred guest may all be in the same 2 GB memory section, or they may be in different 2 GB memory sections. In either case, the non-preferred guest requires the use of both "memory section address translation" and "memory page address translation".

Figure 3:
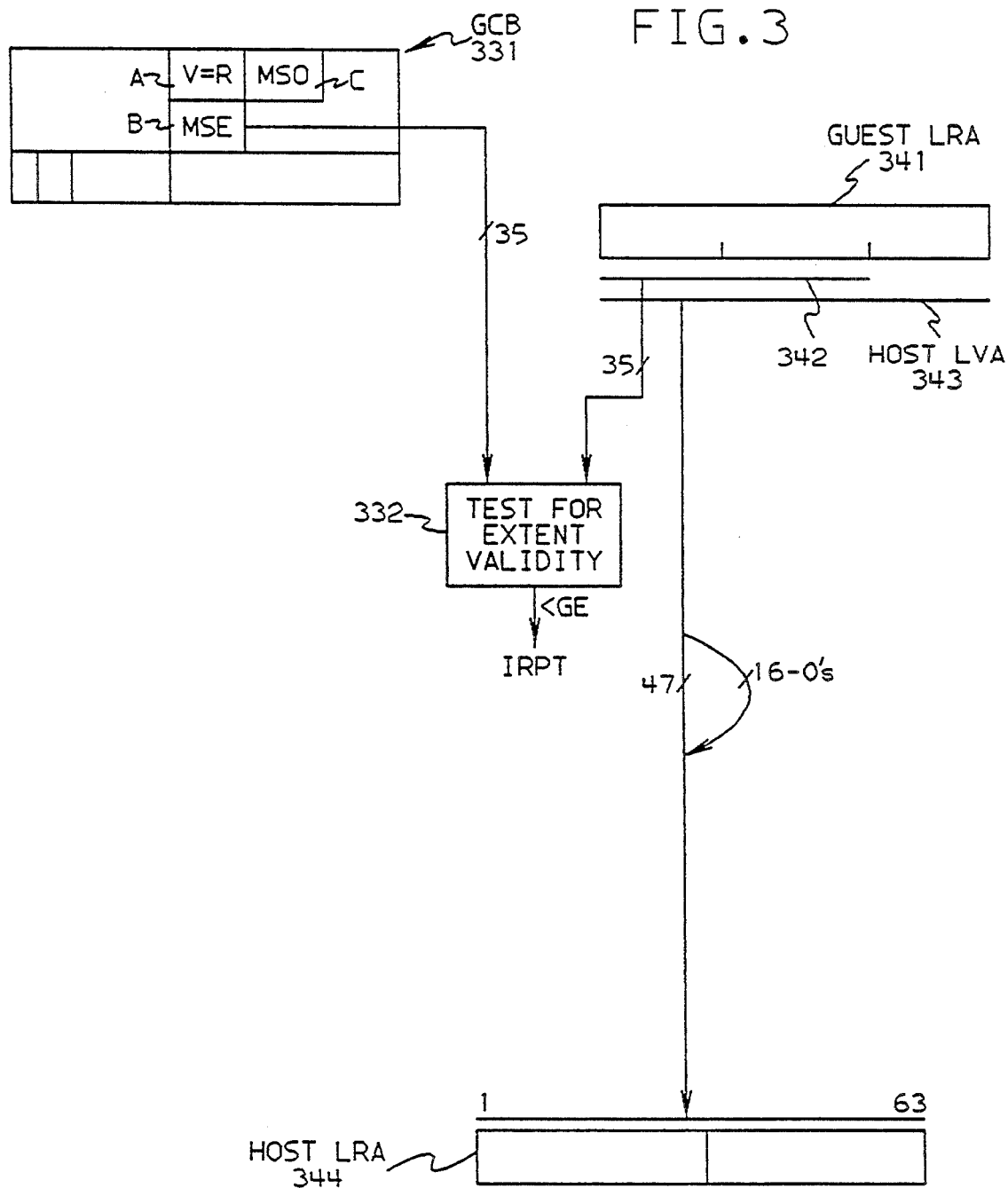
FIG. 3 is a diagram showing how a V=R guest using large real addressing (guest LRA) is mapped to host large real addresses (host LRA).

Large Address Translation for a V=R Guest—FIG. 3

Only one V=R preferred guest is allowed in a system, because the range of addressing for the V=R guest in the host LRAS must start from zero and be exclusive to the V=R guest (although accessible by the host) in host REAL memory. Each V=R guest LRA is mapped directly into the host LRAS.

The range of contiguous addressing for a V=R guest in host LRAS starts from address zero. This contiguous host LRAS area is exclusively assigned to the V=R guest (although accessible by the host).

In FIG. 3, the guest LRA in register 341 does not require translation to host virtual since, for a V=R guest, guest LRA 341 directly provides the host LRA 344 which is directly used to access system memory for the guest's requested data (or instructions).

Thus, a V=R guest address requires very little processing, and therefore can operate very fast in a computer system.

In order to assure that the V=R guest cannot access any part of system memory not allocated to the V=R guest, a comparison test 332 for extent validity is provided in FIG. 3. This test compares a value in a "main storage extent" (MSE) field B in GCB 331 (which contains a MSE limit value) with a high-order part of the V=R guest LRA. If the guest LRA exceeds its assigned MSE value, an exception is recognized.

The size of the compared high-order part of the guest LRA is dependent on the size of the memory units used for the MSE value definition, for example, 1 megabyte units.

Figure 4:
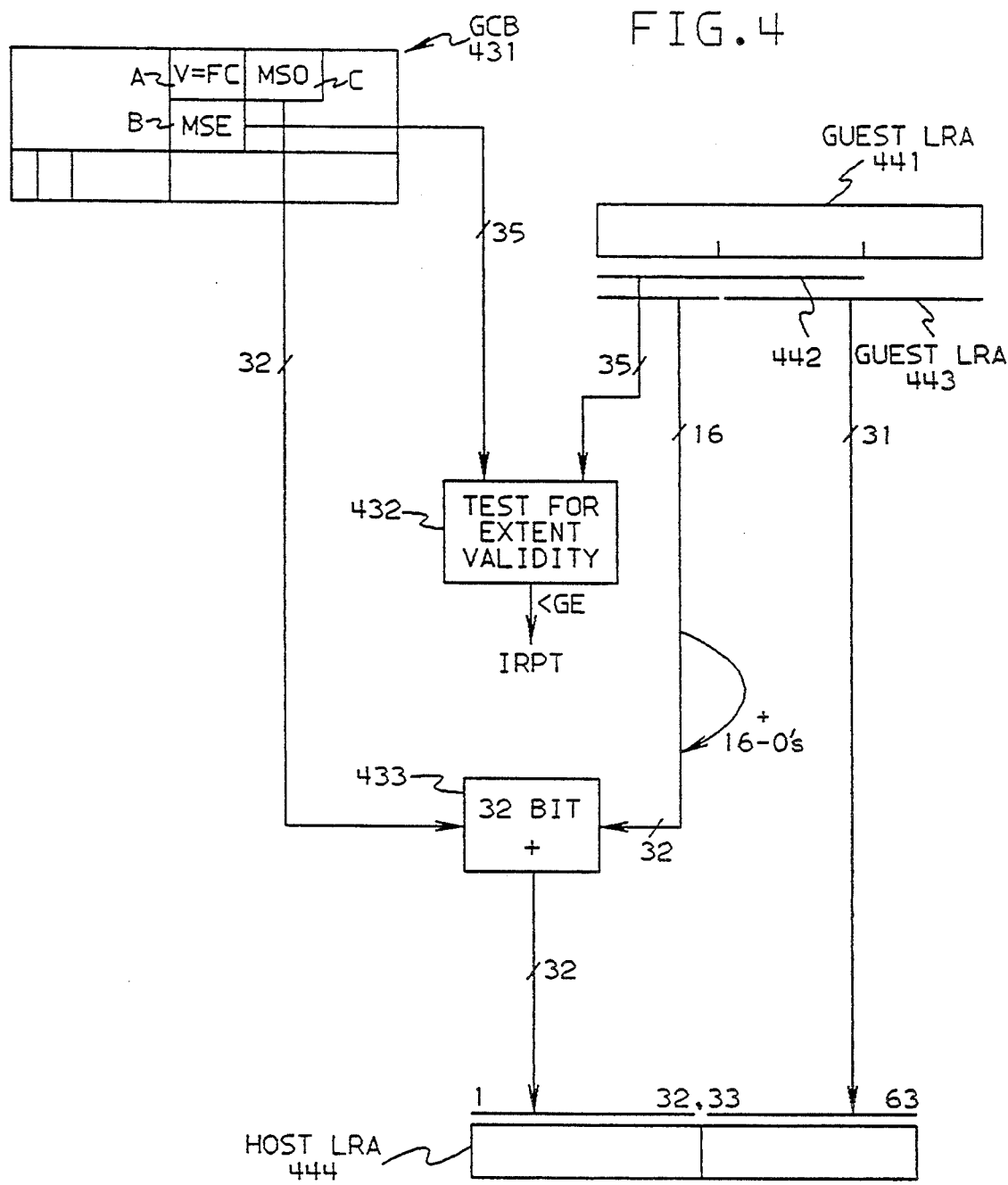
FIG. 4 is a diagram showing how a V=FC (virtual=fixed contiguous) guest using large real addressing (guest LRA) is mapped to host large real addresses (host LRA).

Large Address Translation for a V=FC Guest—FIG. 4

A large number of V=FC preferred guests may be provided in the computer system, because the range of contiguous addressing for a V=FC guest in the host LRAS may start from any address defined in a "main storage offset" (MSO) field C. This contiguous host LRAS area is exclusively assigned to the V=FC guest.

In the embodiments described herein, the term "main storage origin" denotes the offset of guest absolute zero from host real zero for V=FC guests and the offset of guest absolute zero from host virtual zero for V=FD or V=V guests.

A guest LRA register contains the guest LRA 441. The generation of a corresponding host LRA 444 requires that a main storage offset (MSO) value, assigned in field C in GCB 431, be added to the high-order part of the guest LRA 441. V=FC translation does not require conversion to host virtual as part of guest addressing operations, since guest real is assigned at a simple offset in host real addressing. The MSO locates the start of an assigned V=FC guest area in the host LRAS. (The MSO value is not the same as the ALE offset value in FIG. 1.)

The MSO addition is done by adder 433 which adds the value in the MSO field C in GCB 431 to the guest LRA 443. The number of bits in the MSO field is determined by the system storage addressing boundary (a power of 2) chosen for use with the MSO values. Generally, a low-order part of the address is not affected by the addition, depending on the memory boundary chosen for the MSO value.

The resulting host LRA 444 (received in a register) may have a larger bit-size than the guest LRA 441. For example, guest LRA 441 may have a 47 bit size and host LRA 444 may have a 63 bit-size, in which case a 32 bit value in MSO may be added to the high-order 16 bits of C guest LRA 443 (same as the high-order 16 bits of guest LRA 441).

In host mode, addressing guest real can be done through either the method of FIGS. 1 or 2. The method of FIG. 1 can be used if the host uses the "ALEN offset" for the guest in its formation of the host LVA to be used to access a particular guest RA. The ALEN offset determines the starting host LVA for the guest's assigned contiguous section in the host LVAS for host addressing operations.

For the embodiment in FIG. 4, the starting address for the guest's assigned contiguous section in a host LVAS is determined by the number of valid ALEs in the assigned AL assigned to the respective guest. In this embodiment, a system control program sets up a sequence of ALs and their ALE content. The sequence of ALs for the respective guests determines their sequence of guest memory sections in the host LVAS, and the number of contiguous valid ALEs in each guest's AL determines the size of its host virtual memory section. Where an access directory (AD) is used in host addressing to determine the sequence and location of ALs, such AD then determines the location of the guest memory sections in a host LVAS.

The host LRA 444 for the V=FC guest is used to access system memory and no translation table is used in FIG. 4, so that a memory access for a V=FC guest can operate much faster than accesses for guests requiring a translation table access before the corresponding host LRA can be generated for addressing the access for the guest.

In FIG. 4, a comparison test 432 is provided (similar to the operation test in FIG. 3) for assuring that a V=FC guest cannot access any part of system memory not assigned to the V=FC guest. This test compares a value in a "main storage extent" (MSE) field B in GCB 431 (which contains the MSE value) with a high-order part of the guest LRA. If the guest LRA exceeds its assigned MSE value, an exception is recognized.

Access registers (ARs) may not be involved in the translation of a guest real address to a host real address for guest operations even where the translation process involves using any of the P, ALESN, and ALEN fields.

Figure 5:
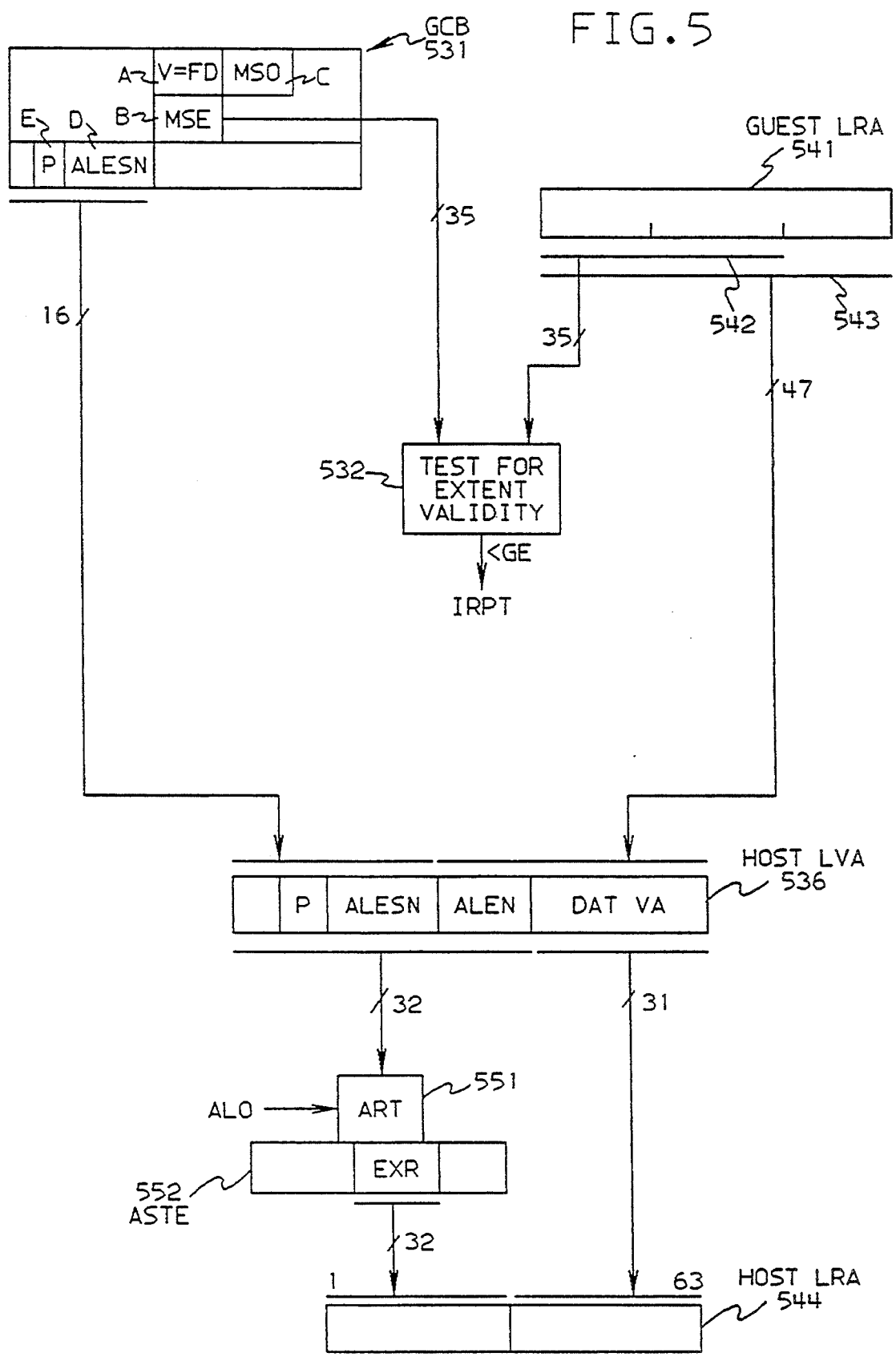
FIG. 5 is a diagram showing how a V=FD (virtual=fixed discontiguous) guest using large real addressing (guest LRA) is mapped to host large real addresses (host LRA) using a separate access list (AL) for each guest and using access register translation (ART) in mapping guest real addresses to host real addresses.

Separate AL For Each V=FD Guest—FIG. 5

A large number of V=FD preferred guests may be provided in a computer system. A V=FD guest has a non-contiguous range of addressing in the host LRAS, and it may include multiple 2 GB non-contiguous blocks of addressing in the host LRAS. Any single 2 GB block of addressing in the host LRAS starts on any 2 GB boundary. The V=FD guest may have exclusive access to its assigned non-contiguous host LRAS blocks. For host access to V=FD guest storage, the storage of a V=FD guest is mapped contiguously in host virtual, as depicted in FIG. 9.

The method of FIG. 5 uses the method described in FIG. 2 which uses a plurality of ALs, one per guest.

In FIG. 5, the generation of a host LRA 544 corresponding to guest LRA 541 is different from and more complex than the method used in FIG. 4 for the V=FC guest. FIG. 5 requires use of an address translation process for selecting the particular 2 GB address range within the host LRAS into which each 2 GB block of the guest LRA 541 is mapped.

A host LVA 536 is generated by registering the guest LRA 541 into the ALEN and low-order 31 bits of the host LVA 536. The content of the guest control block (GCB) 531 fields E and D, containing a P control bit and a ALE sequence number (ALESN) are also registered as part of this host LVA 536.

The low-order 31 bits of the host LVA 536 is gated directly into the host LRA register without translation as the low-order 31 bits of the host LRA 544. However, memory section address translation is used for the high-order part (the P, ALESN and ALEN fields) of the host LVA 536 to select the particular 2 GB address range in the host LRAS that is assigned in the system memory to contain the data accessed with the guest LRA 541.

Then the ART process is initiated for translating host LVA 536 into host LRA 544 for a V=FD guest. FIG. 5 uses the conventional ART process, modified by the invention described in FIGS. 1 and 2 herein and by the invention in application Ser. No. 07/754,810 which changes the resulting conventional small real addresses into large real addresses by a unique way of concatenating high-order extenders (EXRs) to the small real addresses.

The conventional access register translation (ART) process is defined in chapters 1 through 5 in the IBM Enterprise System Architecture/390 Principles of Operation (ESA/390 POP), which may be ordered from the IBM Corporation by using document form number SA22-7201. The ART process is available in current and previous commercial IBM mainframes.

No access register (AR) is involved in the CPU's address translation operations of a guest real to a host real address using the P, ALESN and ALEN contents. However, access register translation (ART) is used with these fields.

The one AL associated with this V=FD guest embodiment (using the method of FIG. 5) is selected among plural ALs available to this guest by using the current state of the P bit registered with the host LVA 536, which select one of two ALs associated with the V=FD guest having assigned GCB 531.

The conventional ART process accesses a required AL at an access list origin (ALO) which is an address conventionally obtained through use of the contents of a predetermined control register in the CPU for addressing the first ALE location in the AL of the respective guest.

Then (using the AL method described for FIG. 2), the ALEN in the host LVA 536 is used as an index from the first ALE in the AL to address the required ALE-j in the AL.

The ALESN in host LVA 536 is compared with an ALESN in ALE-j. This comparison must compare-equal for the ART process to successfully complete. If an non-compare is obtained, the program using the guest LRA 541 is interrupted. All ALEs in the AL used by this guest are assigned the same ALESN value, which is associated with the respective guest in GCB 531.

An ASTE address in ALE-j is used to access an ASTE (ASN second table entry) 552 by the ART operation. Then a 32 bit extender (EXR) field in the ASTE (described in application Ser. No. 07/754,810 is concatenated to the left end of the low-order 31 bits of the guest real address to generate the host LRA 544, which is a 63 bit address in this embodiment.

Any pre-assigned value can be stored in the EXR field of any ASTE to associate the ASTE with any 2 GB range of host large real addressing in the system memory. The LRAs of any V=FD guest may be mapped into any number of 2 GB blocks of addressing, which may be located anywhere in the host's large real addressing range, and thereby be discontiguous with other 2 GB blocks assigned to a single V=FD guest.

Thus, the ALEN in the host LVA 536 (derived from the V=FD guest's LRA 541) is associated with an ALE which is associated with an ASTE which contains an EXR value that maps the guest LRA into a particular 2 GB block of addresses in the host LRAS.

The ASTE-designated 2 GB address blocks may thereby be mapped in a non-contiguous manner for the V=FD guest. Accordingly, a V=FD guest can have a plurality of non-contiguous blocks of addressing in the host LRAS.

The process is ended after the host LRA 544 is generated. That is, the ART process does not continue (as it normally would) to select an STD in another ASTE field, since no address translation is needed for the low-order 31 bits (DAT VA part) of the host LVA 536 in FIG. 5.

Figure 6:
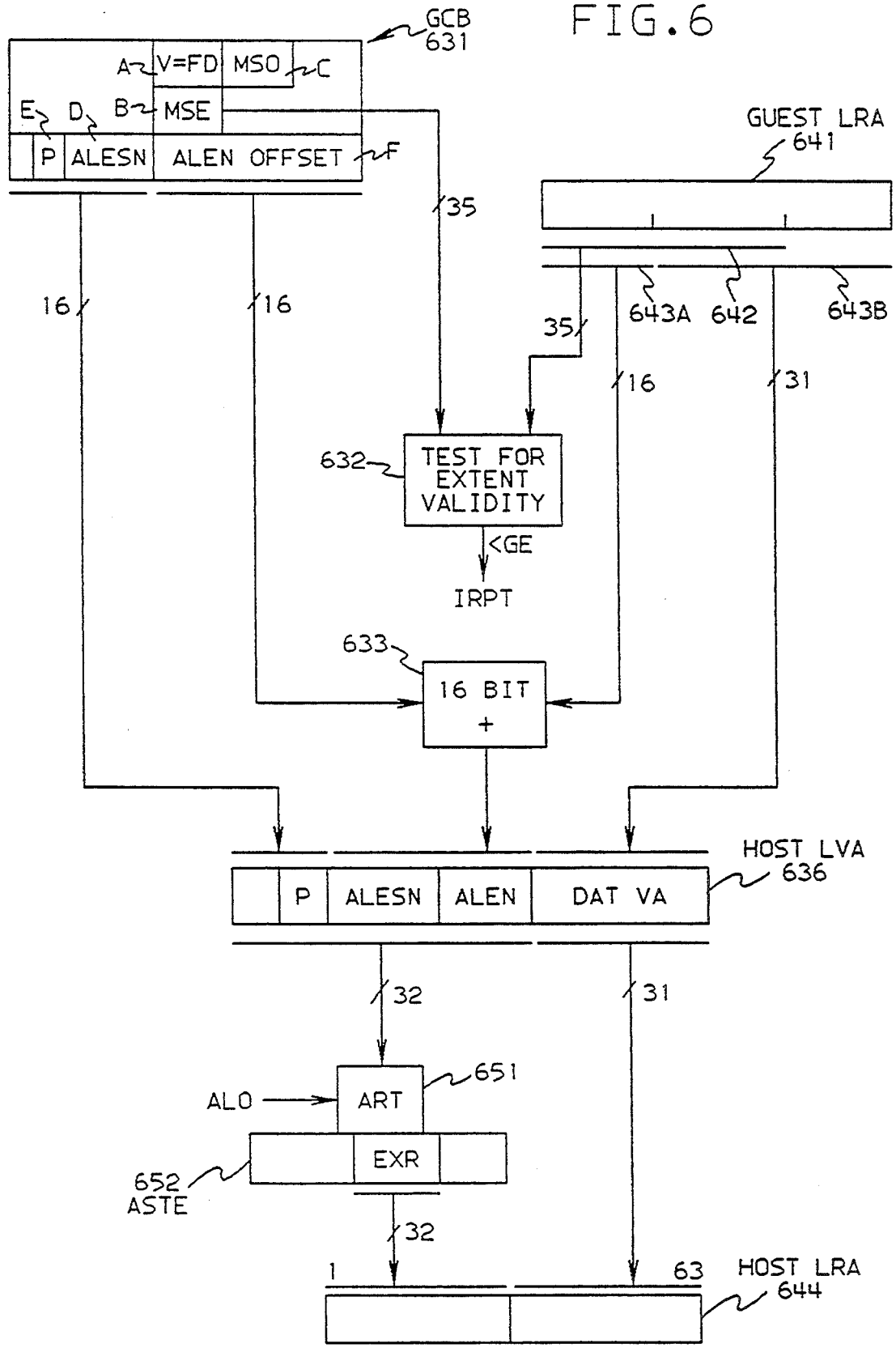
FIG. 6 is a diagram showing how a V=FD (virtual=fixed discontiguous) guest using large real addressing (guest LRA) is mapped to host large real addresses (host LRA) using one access list (AL) for multiple guests, using access register translation (ART).

Single AL for All V=FD Guests—FIG. 6

FIG. 6 performs the same V=FD guest function as FIG. 5. However, FIG. 6 uses the single AL method of FIG. 1, while FIG. 5 uses the multiple AL method of FIG. 2.

Each subset of contiguous ALEs in the AL may represent a V=FD guest. A guest control block (GCB) 631 contains an "ALEN offset" field F that defines the subset assigned to this guest. The value in the ALEN offset field is an index from the first ALE in the AL to the first ALE in the guest's subset to locate the first ALE in the guest's subset.

Fields A, B, C, D and E are the same as in GCB 531 in FIG. 5. The MSE field B defines the number of ALEs in the subset for the respective guest.

In FIG. 6, a host LRA 644 is generated to correspond to guest LRA 641. FIG. 6 also requires use of the ART process for selecting an ASTE that has an EXR field that contains a value that selects a particular 2 GB address range within the host LRAS into which the host LRA 644 is mapped for representing the guest LRA 641.

Unique to FIG. 6, an adder 633 adds the content of ALEN offset field F to a high-order field of the guest LRA 641 selected by a gate 643A at the ALEN bit positions. The resulting output of adder 633 is stored in an ALEN field in a register in which the host LVA 636 is being generated. The low-order 31 bits (DAT VA part) of the host LVA 636 receives corresponding low-order 31 bit positions gated from the guest LRA 641 by gate 643B. Also, GCB fields E and D provide a P bit and a ALE sequence number (ALESN) which are transferred to the high-order part of the host LVA 636. This completes the formation of the host LVA 636 for the guest LRA 641.

The high-order part (the P, ALESN and ALEN fields) of the host LVA 636 use an address translation process to select the particular 2 GB address range in the host LRAS that is assigned in the system memory to receive the host representation of the guest LRA 641.

However, no address translation is used for the low-order 31 bits of the host LVA, and it directly addresses into the selected 2 GB section of the host LRA to obtain the data addressed by the guest.

The ASTE containing the selection of the particular 2 GB block (which may be non-contiguous with other 2 GB blocks of addressing assigned to a V=FD guest in the host LRA) may be obtained by the conventional access register translation (ART) process defined in chapters 1 through 5 in the IBM Enterprise System Architecture/390 Principles of Operation (ESA/390 POP), which is may be ordered from the IBM Corporation by using document form number SA22-7201. The ART process is available in current and previous commercial IBM mainframes.

The required ALE-j in the AL is accessed by using the ALEN in the host LVA 636, in accordance with the method in FIG. 1. ALE-j is selected in the guest AL by indexing therein with the content of the ALEN field in the host LVA 636.

No access register (AR) is involved in the host's address translation operations using the P, ALESN and ALEN contents, even though much of access register translation (ART) is used with these fields.

During the ART process for FIG. 6, the state of the P bit is used to select from one of two predetermined control registers, to address the correct AL for use in the ART process. The ALESN in host LVA 636 is compared with an ALESN in an ALE-j. This comparison must compare-equal for the ART process to successfully complete for this invention. If a non-compare is obtained, the program using the guest LRA 641 is interrupted. All ALEs in the AL used by this guest are assigned the same ALESN value, which is associated with the respective guest in GCB 531.

Thus, the ALEN in the host LVA 636 (derived using the V=FD guest's LRA 641) is associated with an ALE-j in the guest's offsetted subset, and ALE-j is associated with an ASTE which contains an EXR value that maps the guest LRA into a particular 2 GB block of addresses in the host LRAS.

An ASTE address in ALE-j is used to access an ASTE (ASN second table entry) 652 by the ART operation. Then a 32 bit extender (EXR) field in the ASTE (described in application Ser. No. 07/754,810) is concatenated to the left end of the low-order 31 bits of the guest real address to generate the host LRA 644, which is a 63 bit address in this embodiment.

The ASTE-controlled independent 2 GB blocks may thereby be mapped in a non-contiguous manner for the V=FD guest by the setting in the EXR field with the ASTE. Accordingly, a V=FD guest can have a plurality of non-contiguous 2 GB blocks of addressing in the host LRAS, whether a single AL is used for all guests, or whether a different AL is used for each of plural guests.

The ART process itself does not complete for the embodiments in FIGS. 5 and 6). That is, the conventional ART process does not complete until it accesses an STD in its ASTE. But, no STD is required by the embodiments in FIGS. 5 and 6.

Figure 7:
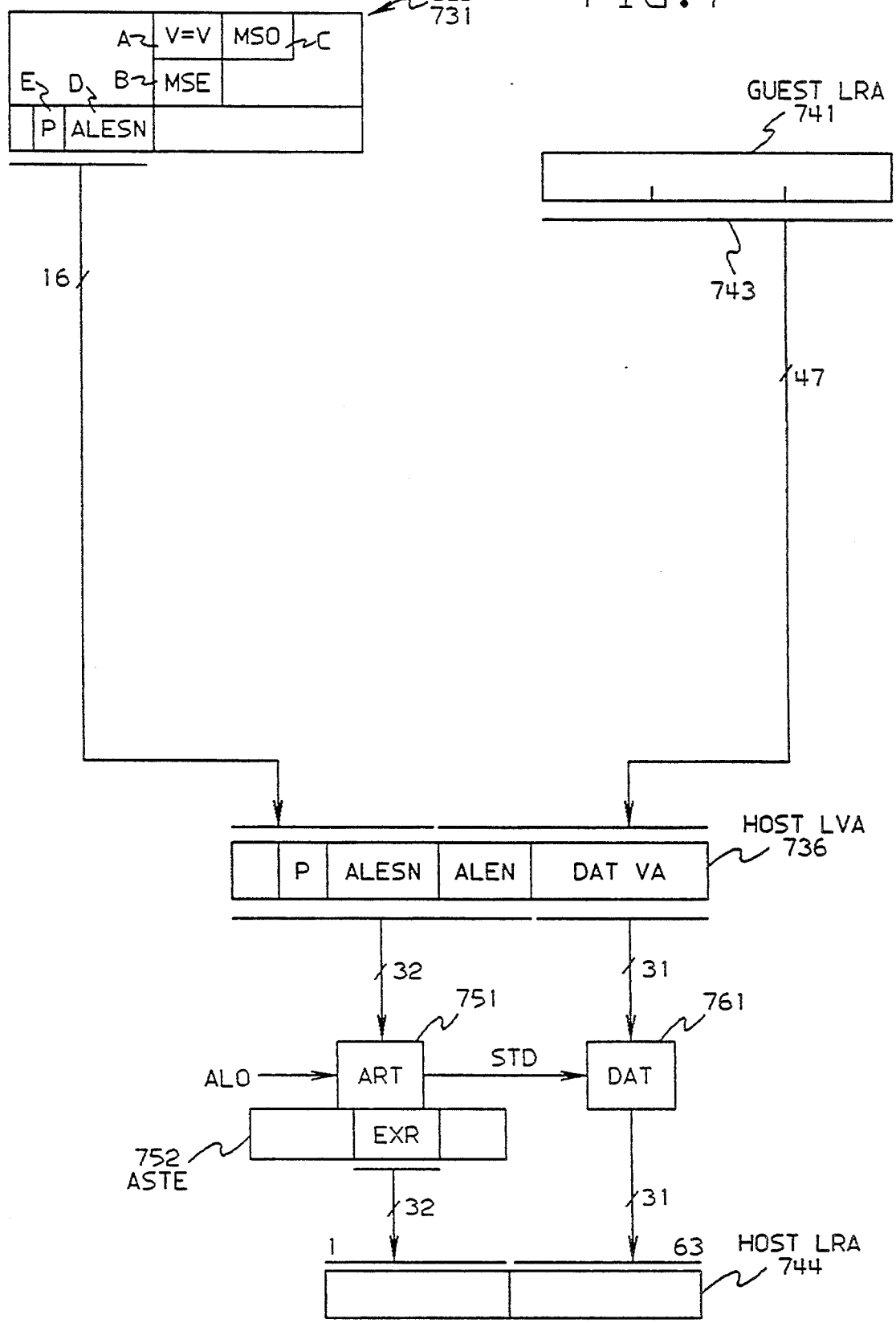
FIG. 7 is a diagram showing how a V=V (virtual=virtual) guest using large real addressing (guest RA) is mapped to host large real addresses (host LRA) using a separate access list (AL) for each guest using access register translation (ART) and DAT.

Separate AL for Each V=V Guest—FIG. 7

A large number of V=V non-preferred guests may be provided in a computer system operating under this invention. Each V=V guest accesses a plurality of page-frames located anywhere in the system memory of the computer system, which may be non-contiguous anywhere in the host LRAS (which is the addressing in the computer's system memory). Each page frame has a 4 KB block size in system memory—contrasting with the 2 GB block size of each addressing block in system memory provided in the embodiments of FIGS. 5 and 6.

The FIG. 7 V=V guest uses the AL method described in FIG. 2 (which uses a plurality of ALs, one AL per guest). V=V guests may be mapped into a single host LVAS or may be mapped into multiple distinct host LVASs.

Each LRA 741 of a V=V guest is required to use both of: 1. A memory section address translation process for selecting a particular 2 GB section within a host LVAS, and 2. A page frame address translation process for selecting the particular page frame within the selected section in the host LVAS to access the data being addressed by the guest LRA 741.

A host LVA 736 is generated by: 1. Registering the guest LRA 741 into the ALEN and the low-order (DAT VA) bit positions of the host LVA 736, and 2. Registering the content of fields E and D (i.e. P bit and ALESN) from the guest control block (GCB) 731 the left part of this host LVA 736.

Except for the special case of the MCDS V=V guest, no access register (AR) is involved in these guest to host address translation operations, using the P, ALESN, and ALEN contents. However, the conventional access register translation (ART) process is used as defined in chapters 1 through 5 in the IBM Enterprise System Architecture/390 Principles of Operation (ESA/390 POP), which is may be ordered from the IBM Corporation by using document form number SA22-7201-00. The ART process is available in current and previous commercial IBM mainframes.

During the ART process for FIG. 7, the P bit is used in the selection of an address ALO from one of two predetermined control registers for accessing the AL. ALE-j is selected by indexing from the top of that AL using the content of the ALEN field in the host LVA 736. The ALESN in host LVA 736 is compared with an ALESN in ALE-j in the guest-assigned AL. This ALESN comparison must compare-equal for the ART process to successfully complete. If a non-compare is obtained, the currently-executing program using the guest LRA 741 is interrupted, All ALEs in the AL used by this guest are assigned the same ALESN value found in field D in GCB 731.

ALE-j also contains an address that accesses an ASTE (ASN second table entry) 752 used by each ART operation. Each ASTE contains an extender (EXR) field, which is described in an embodiment of an invention claimed in patent application Ser. No. 07/754,810 that extends a small real address (31 bit RA) into a large real address (LRA), which may be a 63 bit address containing a 32 bit extender concatenated to the high-order end of a 31 bit small address. The selected ASTE 752 contains an address (i.e. STD) of a translation table (a segment table in the preferred embodiment).

The EXR field in the selected ASTE is obtained and gated into the high-order part of the host LRA 744. The STD (segment table designation) is obtained from another field in the ASTE to initiate the DAT process 761 which performs the address translation of its low-order 31 bits (DAT VA part).

Any pre-assigned value can be stored in the EXR field of any ASTE to associate the resulting host LRA with any 2 GB range in the large real memory of the computer system. The LRAs of any V=V guest may be mapped into any number of 4 KB blocks (page frames) of addressing, which may be located anywhere in the host's large real addressing range, and thereby be discontiguous with other page frames assigned to the same V=V guest.

The value of EXR is obtained from the ASTE in this embodiment, as shown in FIG. 7. EXR may also be obtained from the DAT process, as described in application Ser. No. 07/754,810.

Thus, the concatenation of the EXR and the translated low-order 31 bits form the host LRA used for obtaining data being addressed by the guest LRA 741.

A V=V non-preferred guest may be an MCDS guest, for which a special case of the translation process shown in FIG. 7 is used. MCDS mode is indicated in the GCB. An MCDS guest can provide 64 bit logical addresses that are, from the point of view of the guest, ALET-qualified RAs. These ALET-qualified RAs are in the ESA format of ALET and 32-bit low-order byte address. The ALET contains a P bit, an ALESN and an ALEN as is usual for ESA. Each specifiable guest MCDS real address is 31 bits in size, but the guest has access to multiple such guest real address spaces because of the ALET qualification.

For an MCDS guest operating with ALET-qualified RAs, the P and ALESN fields in the host LVA 736 are taken from the guest-supplied 64-bit address instead of from the GCB. Thus, the guest "real" address is processed as a host virtual address using the AL specified by the P field.

In the case of MCDS guests, the preferred embodiment is to define all of a specific guests address spaces in one or more integral ALs, with no AL containing address spaces of more than one guest.

When executing in "host" mode, the host accesses the MCDS guest address spaces via host virtual storage by initializing the appropriate host control registers to address the proper ALs for the particular executing guest.

Figure 8:
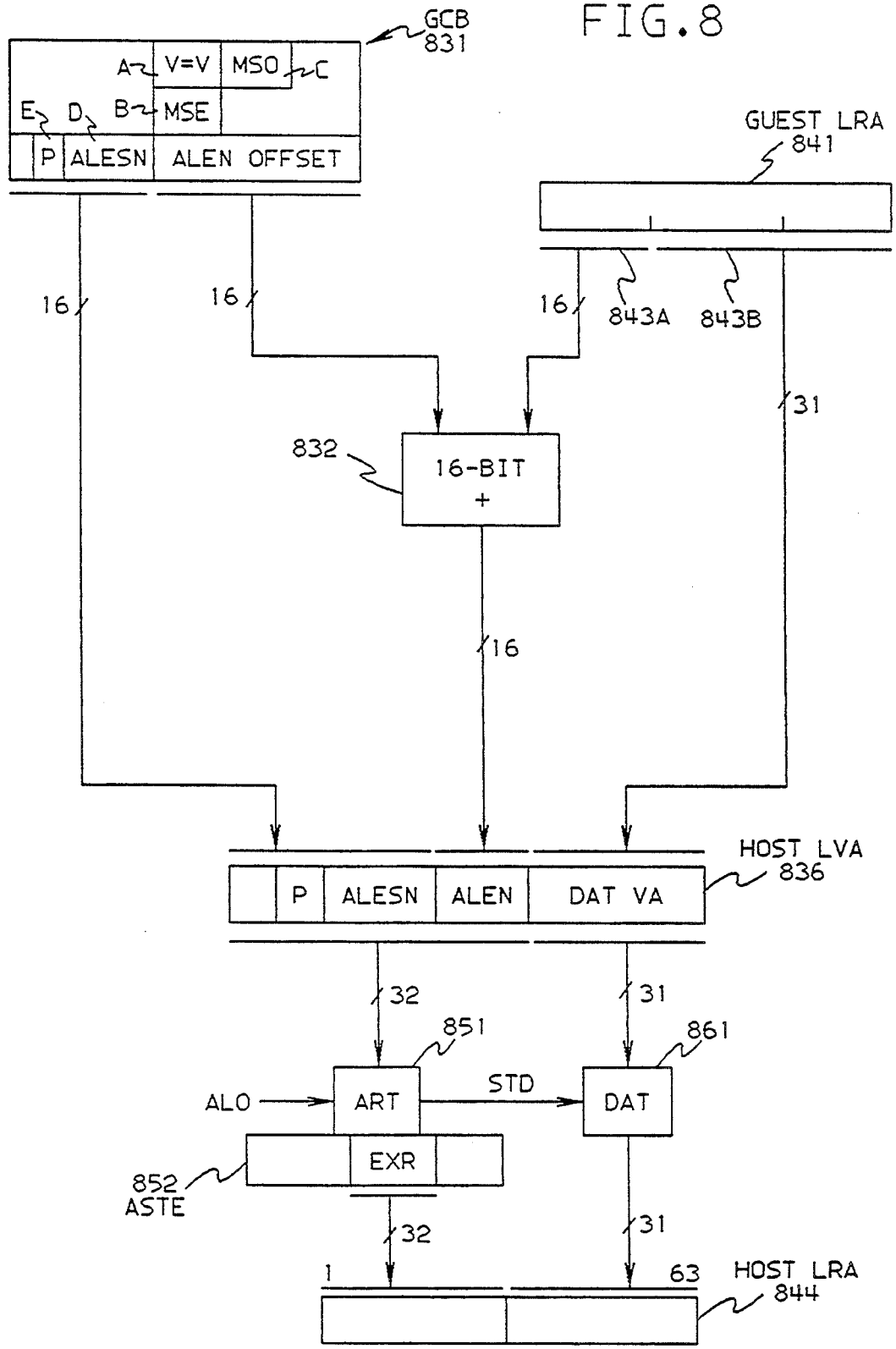
FIG. 8 is a diagram showing how a V=V (virtual=virtual) guest using large real addressing (guest LRA) is mapped to host large real addresses (host LRA) using one access list (AL) for multiple guests using access register translation (ART) and DAT.

Single AL for All V=V Guests—FIG. 8

The embodiment in FIG. 8 performs the same V=V guest function as is performed in FIG. 7, except that FIG. 8 uses the ALE offset method of FIG. 1, while FIG. 7 uses the multiple AL method of FIG. 2.

For FIG. 8 a single AL contains subsets of ALEs for all guests, according to the method in FIG. 1. Each subset contains a contiguous set of ALEs which follow the rules previously described for FIG. 1. Any subset in the AL may represent any type of guest, e.g. V=FC, V=FD or V=V guest.

Each subset of ALEs starts at a predetermined ALEN offset, which is provided in all ALEN offset field F in the guest control block (GCB) 831. Fields A, B, C, D and E in GCB 831 are the same as in GCB 731 in FIG. 7. ALEN offset field F in GCB 831 defines the beginning of the respective guest's subset in the AL by indicating the number of ALEs to the subset, from the first ALE in the AL to the first ALE in the subset for the respective guest. MSE defines the number of ALEs in the subset.

In FIG. 8, a host LRA 844 is translated from guest LRA 841 to locate in the computer's system memory the data being addressed by guest LRA 841. The process of changing guest LRA 841 into host LRA 844 uses the ART process, which selects an ASTE that has an EXR field that contains a value that selects a particular 2 GB address range within the host LRAS which contains the data being addressed by guest LRA 841.

FIG. 8 has an adder 832 which adds the content of ALEN offset field F to a high-order field in the guest LRA 841 selected by a gate 843A. This high-order field comprises the bits in the guest LRA 841 at the same bit positions as the ALEN field in the host LVA 836 in the register in which the host LVA 836 is being generated. The resulting output of adder 833 is stored in the ALEN field in the register in which the host LVA 836 is being generated. The low-order bit positions in the guest LRA 841 are gated by gate 843B to corresponding low-order (DAT VA) bit positions in the generation register holding host LVA 836.

Also, the content of fields E and D in the guest control block (GCB) 831 (containing a P selection bit and an ALE sequence number, ALESN) are gated into a high-order part of the register for the host LVA 836. This completes the process of forming a host LVA 836 corresponding to a guest LRA 841.

Then the ART/DAT process is initiated for translating host LVA 836 into host LRA 844 for the V=V guest. In FIG. 8, the conventional ART process is modified by the invention in application Ser. No. 07/754,810 and by the subject invention being described herein to change a resulting translated small real address into the translated large real address by concatenating a high-order extender (EXR) to the high-order end of the small real address.

The conventional access register translation (ART) process is defined in chapters 1 through 5 in the IBM Enterprise System Architecture/390 Principles of Operation (ESA/390 POP), which may be ordered from the IBM Corporation by using document form number SA22-7201. The ART process is available in current and previous commercial IBM mainframes.

The ART process used herein accesses a required AL at an access list origin (ALO) which is an address obtained through the use of the contents of a predetermined control register in the CPU for addressing the first ALE location in the AL. The state of the P bit in LVA 836 indicates the correct AL to be used in the ART process.

Then, the ALEN in the host LVA 836 (which contains the ALEN offset in GCB 831) is used as an index from the first ALE in the AL to the required ALE-j (using the single AL method described for FIG. 1).

Except for the special case of the MCDS V=V guest, no access register (AR) is used in FIG. 8 for guest-to-host address translation operations involving the P, ALESN, and ALEN fields in the host LVA 836, even though the access register translation (ART) methodology is used.

The ALESN in host LVA 836 is compared with an ALESN in the accessed ALE-j. A compare-equal condition must be obtained for this ART process to successfully complete. If a non-compare is obtained, the guest program specifying the guest LRA 841 is interrupted. All ALEs in the subset assigned to this guest must contain the ALESN value found in field D of GCB 831.

ALE-j contains an address for an ASTE, which is accessed in the computer memory. The ASTE contains an EXR field with an EXR value that maps the guest LRA into a particular 2 GB block of addresses in the host LRAS (which corresponds to the computer's main memory). That ASTE also contains a conventional STD (segment table designation) which is the address of the required translation table used for translating the low-order 31 bits (DAT VA portion) of the host LVA 836 into a small address which is extended by the EXR obtained from the same ASTE.

The EXR field in the selected ASTE is obtained and gated into the high-order part of the host LRA 744. The STD (segment table designation) is obtained from another field in the ASTE to initiate the DAT process 761 which performs the address translation of its low-order 31 bits (DAT VA part).

Any pre-assigned value can be stored in the EXR field of any ASTE to associate the resulting host LRA with any 2 GB range in the large real memory of the computer system. The LRAs of any V=V guest may be mapped into any number of 4 KB blocks (page frames) of addressing, which may be located anywhere in the host's large real addressing range, and thereby be discontiguous with other page frames assigned to the V=V guest.

The value of EXR is obtained from the ASTE in this embodiment, as shown in FIG. 8. EXR may also be obtained from the DAT process, as described in application Ser. No. 07/754,810.

Thus, the concatenation of the EXR and the translated low-order 31 bits (DAT VA) form the host LRA used for obtaining data being addressed by the guest LRA 741.

Although this invention has been shown and described with respect to plural embodiments thereof, it will be understood by those skilled in the art that various changes and omissions in the form and details of the invention may be made therein without departing from the spirit and the scope of the invention.

Having thus described our invention, what we claim as new and desire to secure by Letters Patent is:

1. Means for addressing data of a guest in a large memory of a computer system having a plurality of guest operating systems (guests) supervised by a host hypervisor program (host), each guest having a guest real address space (RAS) and using guest real addresses (guest RAs) within the guest RAS, and locating each guest RA within a host large real address space (host LRAS) which addresses the large memory of the computer system, comprising:

a host LVAS (large virtual address space) represented in the computer memory by a sequence of entries (ALEs) in one or more host access lists (ALs), each ALE representing a unit of 2 GB virtual addressing in the host LVAS;

a subset of one or more contiguous ALEs in a host LVAS being allocated for each guest RAS;

means for registering each guest real address (RA) provided by a guest for accessing guest data in the computer memory;

means for generating a host large real address (host LRA) by generating a high-order part (ALEN bits) representing a section of the computer memory corresponding to an ALE in the subset allocated to a preferred guest, and means for generating a low-order part of the host LVA by concatenating to the high-order part a low-order part comprised of bits from the guest RA having an order below the generated high-order part.

2. Means for addressing data of a guest in a large memory of a computer system having a plurality of guest operating systems (guests) supervised by a host hypervisor program (host), each guest having a guest real address space (RAS) and using guest real addresses (guest RAs) within the guest RAS, and locating each guest RA within a host large real address space (host LRAS) which addresses the large memory of the computer system, comprising:

a host LVAS (large virtual address space) represented in the computer memory by a sequence of entries (ALEs) in one or more host access lists (ALs), each ALE representing a unit of virtual addressing in the host LVAS;

a subset of one or more contiguous ALEs in a host LVAS being allocated for each guest RAS;

means for registering each guest real address (RA) provided by a guest for accessing guest data in the computer memory;

means for generating a host large real address (host LRA) by generating a high-order part (ALEN bits) representing a memory section in the computer memory for a corresponding ALE in the subset allocated to a V=V guest; and means for generating a low-order part of the host LRA by accessing a dynamic address translation (DAT) table associated with the corresponding ALE for address translating a small address part of the corresponding guest RA (or all of the corresponding guest RA if it is a small address) to obtain a host large real address (host LRA) in the memory section represented by the high-order part for completing the generation of a host LRA in the computer memory corresponding to the guest real address.

3. A method for locating guest real addresses (guest RAs) in a host real address space (host LRAS) of a large memory of a computer system in which a plurality of guest operating systems (guests) are supervised by a host program (host), each of said plurality of guest operating systems having assigned to it a real address space (RAS), said method comprising the steps of:

subdividing into contiguous units said real address space for all of said guest operating systems, each of said units comprised of a large number of consecutive guest real addresses with a guest real address at a boundary of each unit consecutive with a guest real address at a boundary of an adjacent unit;

assigning a guest real address space for each of said guest operating systems to an integral number of contiguous units;

establishing, in a host large virtual address space (LVAS), one or more host access lists (ALs), each host access list comprised of a plurality of contiguous access lists entries (ALEs), each access list entry representing a respective one of said contiguous units;

generating a host large virtual address (host LVA) corresponding to each guest real address for addressing data in the computer memory;

selecting an access list entry in a selected access list by using a high-order field of the host large virtual address;

accessing a dynamic address translation (DAT) table when a DAT on state exists for the host program, the DAT table being associated with the selected access list entry for address translating a low-order part of the corresponding host LVA to obtain a host large real address in the computer memory corresponding to the guest real address; and providing special mapping means for preferred guests by which their guest real addresses are mapped to host real addresses without performing certain of the operations of host virtual to host real address translation to provide high-performance operations for preferred guest.

4. An addressing method for locating guest data in a large memory of a computer system as defined in claim 3, the assigning step further comprising:

assigning each guest using small real addresses (SRAs) to a unique single ALE of a host LVAS in which a guest small RA has a size of not over 31 bits.

5. An addressing method for locating guest data in a large memory of a computer system as defined in claim 3, the assigning step further comprising:

assigning each guest using large real addresses (LRAs) to a unique plurality of contiguous ALEs of a host LVAS in which a guest LRA has a size greater than 31 bits.

6. An addressing method for locating guest data in a large memory of a computer system as defined in claim 3, the assigning step further comprising:

assigning each guest using large real addresses (LRAs) to a unique plurality of contiguous ALEs of a host LVAS in which a guest LRA has a size greater than 31 bits;

assigning each guest using small real addresses (SRAs) to a unique single ALE of a host LVAS in which a guest small RA has a size of not over 31 bits; and making the assignments to the guests in a host LVAS in any order, allowing intermixing of guests using SRAs and LRAs in the addressing sequence of the host LVAS.

7. An addressing method for locating guest data in a large memory of a computer system as defined in claim 3, further comprising the steps of:

providing the host with an address to an AL for each guest; and containing a subset of the ALEs comprising a host LVAS in the AL for each guest.

8. An addressing method for locating guest data in a large memory of a computer system as defined in claim 7, the providing step further comprising:

providing predetermined host control registers specifying the address to the AL defining storage for a respective guest; and accessing by the CPU of the AL address through the use of the contents of a control register (CR) when the host dispatches the respective guest on a CPU.

9. An addressing method for locating guest data in a large memory of a computer system as defined in claim 8, further comprising the steps of:

assigning the ALEs in the AL defining the real storage of a respective guest contiguously from the beginning of the AL, and invalidating the ALEs following the assigned ALEs in the AL for the guest.

10. An addressing method for locating guest data in a large memory of a computer system as defined in claim 3, the further comprising the steps of:

the host providing a CPU with an address of an AL containing a plurality of subsets of ALEs, each subset having one or more contiguous ALEs assigned for the use of a respective guest.

11. An addressing method for locating guest data in a large memory of a computer system as defined in claim 10, the providing step further comprising:

having a single AL for containing the subsets for all guests in a host LVAS.

12. An addressing method for locating guest data in a large memory of a computer system as defined in claim 10, the providing step further comprising:

having a plurality of ALs, each AL containing a subset of less than all guests in a host LVAS.

13. An addressing method for locating guest data in a large memory of a computer system as defined in claim 12, further comprising the steps of:
assigning the ALEs in the subset for a respective guest contiguously from the beginning of the AL, and invalidating the ALEs following the assigned ALEs in the subset for the guest.

14. An addressing method for locating guest data in a large memory of a computer system as defined in claim 12, further comprising the steps of:
assigning a virtual equals real (V=R) type of guest to the first subset of ALEs in an AL assigned to represent the first guest in the host LRAS for having the guest RAs and LRAs be the same as both the host LRAs and the host LVAs; and
accessing this V=R guest's real storage as part of a host LVAS by the host in DAT-on mode, whereas, the CPU interprets the guest real addresses as host real addresses bypassing the host address translation, for improved performance during guest operation.

15. An addressing method for locating guest data in a large memory of a computer system as defined in claim 10, further comprising the steps of:
providing a guest control block (GCB) containing an offset in the AL for a respective guest; and
the host initializing this AL offset in the GCB when the host is to dispatch the respective guest on a CPU, to be used by the CPU during guest operation to translate guest real addresses to host real addresses.

16. An addressing method for locating guest data in a large memory of a computer system as defined in claim 15, further comprising the steps of:
comparing a high-order part of each guest address with an extent of the main store in the GCB of the guest, and allowing an access for a guest to continue only if the comparing operation finds the guest address is not greater than the extent of the main store on any chosen 2**N address boundary.

17. An addressing method for locating guest data in a large memory of a computer system as defined in claim 3, further comprising the steps of:
assigning a virtual equals fixed-contiguous (V=FC) type of guest to any contiguous subset of ALEs in an AL;
assigning a main storage origin (MSO) field in a guest control block (GCB) of the respective guest to specify the start location in main storage; and
accessing this V=FC guest's real storage as part of a host LVAS by the host in DAT-on mode, whereas the CPU offsets the guest real address bypassing the host address translation, for improved performance during guest operation.

18. An addressing method for locating guest data in a large memory of a computer system as defined in claim 17, further comprising the steps of:
comparing a high-order part of each guest address with an extent of the main store in the GCB of the guest, and allowing an access for a guest real address to continue only if the comparing operation finds the guest address is not greater than the extent of the main store on any chosen 2**N address boundary.

19. An addressing method for locating guest data in a large memory of a computer system as defined in claim 3, further comprising the steps of:
assigning a virtual equals fixed-discontinuous (V=FD) type of guest to any contiguous subset of ALEs in an AL, and using a guest real address as a corresponding host LVA;
accessing an offset field in a guest control block (GCB) of the respective guest to specify a first ALE in the AL defining the real storage of the respective guest, or a first ALE in a subset of ALEs assigned to the guest in an AL having a plurality of guest subsets;
using a high-order part (ALEN) of the corresponding host LVA to locate a required ALE in the AL, or in the guest's subset of ALEs, representing the guest's assigned part of a host LVAS;
executing access register translation (ART) associating a respective extender (EXR) with each valid ALE; and
concatenating the extender with a low-order part of the guest LVA, bypassing the DAT operation for the low-order part to provide improved performance, to generate a host LRA which is the location in the computer memory of the guest real address; and
accessing this V=FD guest's real storage as part of a host LVAS by the host in DAT-on mode, whereas the CPU does ART to locate each 2 GB of a V=FD guest address, but avoids the DAT operation for the low-order 31 bits for improved performance during guest operation.

20. An addressing method for locating guest data in a large memory of a computer system as defined in claim 19, further comprising the steps of:
comparing a high-order part of each guest address with an extent of the main store in the GCB of the guest, and allowing an access for a guest to continue only if the comparing operation finds the guest address is not greater than the extent of the main store on any chosen 2**N address boundary.

21. An addressing method for locating guest data in a large memory of a computer system as defined in claim 3, further comprising the steps of:
assigning a virtual equals virtual (V=V) type of guest to any contiguous subset of ALEs in an AL, and using a guest real address as a corresponding host LVA;
accessing a main storage origin (MSO) field and/or an offset field in a guest control block (GCB) of the respective guest to specify a first ALE in the AL defining the real storage of the respective guest, or a first ALE in a subset of ALEs assigned to the guest in an AL having a plurality of guest subsets;
using a high-order part (ALEN) of the corresponding host LVA to locate a required ALE in the AL, or in the guest's subset of ALEs, representing the guest's assigned part of a host LVAS;
executing access register translation (ART) associating a respective dynamic address translation (DAT) table with the required ALE, and obtaining a respective extender (EXR) from the ART or the DAT process;
address translating a low-order part of the corresponding host LVA to obtain a small translated address; and concatenating the extender and the small translated address to generate a host LRA which represents the location in the computer memory of the guest real address.

22. An addressing method for locating guest data in a large memory of a computer system as defined in claims 17, 19 or 21, further comprising the steps of:
providing a sequence number (SN) in the GCB of the respective guest which is chosen to be the same as a sequence number (ALESN) in each ALE assigned to the respective guest;
comparing the SN with the ALESN during the ART process to determine if they have the same value; and
interrupting the generation of the guest real address if a non-equal comparison is found, and continuing the addressing operation if equality is found.

23. An addressing method for locating guest data in a large memory of a computer system as defined in claim 3, further comprising the steps of:
providing a plurality of ALs selectable for a guest for containing plural segments of a host LVAS selectable by the guest; and
accessing by a CPU of a field (P) in a guest control block for indicating a particular AL to be selected for use in the CPUs translation of guest real addresses to host real addresses.

24. An addressing method for locating guest data in the host LRAS during guest operation as defined in claim 3, also providing:
host addressing of the real storage of all guests in a single host virtual address space for mapping guest real addresses to host virtual addresses; and
creating this single host virtual address space by concatenating multiple ALs to map multiple guests of all types in a host access directory (AD).

25. An addressing method for locating guest data in the host LRAS during guest operation as defined in claim 3, also providing:
host addressing of the real storage of all guests in a single host virtual address space for mapping guest real addresses to host virtual addresses; and
concatenating entries (ALEs) in a single access list (AL) for mapping guest storage of all types (V=R, V=FC, V=FD, V=V) in a single host virtual address space.

* * * * *